(12) United States Patent
Lettvin

(10) Patent No.: US 7,796,173 B2
(45) Date of Patent: Sep. 14, 2010

(54) IMAGING SYSTEM

(76) Inventor: Jonathan D. Lettvin, 299 School St., Watertown, MA (US) 02472

( * ) Notice: Subject to any disclaimer, the term of this patent is extended or adjusted under 35 U.S.C. 154(b) by 1793 days.

(21) Appl. No.: 10/918,151

(22) Filed: Aug. 13, 2004

(65) Prior Publication Data
US 2005/0036655 A1 Feb. 17, 2005

Related U.S. Application Data

(60) Provisional application No. 60/494,717, filed on Aug. 13, 2003.

(51) Int. Cl.
*H04N 3/14* (2006.01)
*H04N 5/335* (2006.01)

(52) U.S. Cl. .............. 348/294; 348/300; 348/301; 348/302; 348/307; 348/312

(58) Field of Classification Search ............ 348/294, 348/300, 301, 302, 307, 312; 250/208.1; 257/290–292
See application file for complete search history.

(56) References Cited

U.S. PATENT DOCUMENTS

| 3,492,497 | A |   | 1/1970  | Gilmour et al. | 307/229 |
|-----------|---|---|---------|----------------|---------|
| 3,574,443 | A |   | 4/1971  | Nanba          | 356/215 |
| 3,781,119 | A | * | 12/1973 | Mori           | 356/222 |
| 3,829,865 | A |   | 8/1974  | Kamasako       | 354/24  |
| 3,902,812 | A |   | 9/1975  | Honkawa        | 356/188 |
| 4,243,318 | A |   | 1/1981  | Stohr          | 356/39  |
| 4,473,836 | A |   | 9/1984  | Chamberlain    | 357/30  |
| 4,584,606 | A |   | 4/1986  | Nagasaki       | 358/209 |
| 4,598,414 | A |   | 7/1986  | Dries et al.   | 377/58  |
| 4,742,238 | A |   | 5/1988  | Sato           | 250/578 |
| 4,806,791 | A |   | 2/1989  | Mizuide        | 307/355 |
| 4,973,833 | A |   | 11/1990 | Takada et al.  | 250/208.1 |
| 4,983,841 | A |   | 1/1991  | Stewart et al. | 250/358.1 |
| 5,500,615 | A |   | 3/1996  | Barter         | 327/111 |
| 5,812,008 | A |   | 9/1998  | Nigel          | 327/350 |

(Continued)

OTHER PUBLICATIONS

*The International Search Report and the Written Opinion of the International Searching Authority*, International Application No. PCT/US04/26406, International Searching Authority, Aug. 5, 2008, 13 pages.

(Continued)

*Primary Examiner*—Yogesh K Aggarwal
(74) *Attorney, Agent, or Firm*—Sunstein Kann Murphy & Timbers LLP

(57) ABSTRACT

Signals from an object in a field of view are detected by an array of directional sensors and "re-converged" to create a three-dimensional image as the object changes contrast or moves relative to the sensors. Each sensor is oriented along an axis toward the field of view. Sensor signals are converted to logarithms thereof and transients are detected and compared to background signals. Resulting signals are connected in overlapping groups to coincidence detectors in a matrix. Each point in the field of view where two or more sensor axes intersect is represented by a coincidence detector, which is connected to the corresponding group of sensors. If a threshold number of sensors in the group detects a transient, the corresponding point in the image is deemed to be "contrasty" and can be made visible or otherwise perceivable by a human or can be further processed by a computer or other circuit.

2 Claims, 21 Drawing Sheets

U.S. PATENT DOCUMENTS

| | | |
|---|---|---|
| 7,231,017 B2 | 6/2007 | Gertsenshteyn et al. ....... 378/87 |
| 7,362,432 B2 | 4/2008 | Roth .......................... 356/317 |
| 2002/0054726 A1 | 5/2002 | Fondeur et al. ............... 385/15 |
| 2002/0106151 A1 | 8/2002 | Ranalli ....................... 385/27 |
| 2003/0036700 A1 | 2/2003 | Weinberg ................... 600/436 |
| 2003/0135836 A1 | 7/2003 | Chang et al. .................. 716/11 |

OTHER PUBLICATIONS

*The International Search Report and the Written Opinion of the International Searching Authority*, International Application No. PCT/US04/38505, International Searching Authority, Aug. 5, 2008, 10 pages.

* cited by examiner

SECTION A-A

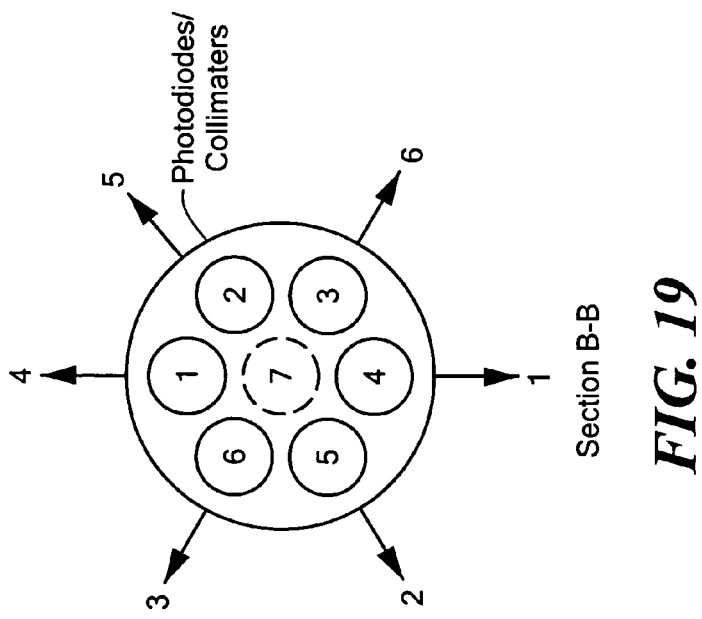

C+D excites A to glow green (to indicate an up transient)
E+F excites B to glow red (to indicate a down transient)

IMAGING SYSTEM

CROSS REFERENCE TO RELATED APPLICATIONS

This application claims the benefit of U.S. Provisional Application No. 60/494,717 titled "Vision System," filed Aug. 13, 2003.

STATEMENT REGARDING FEDERALLY SPONSORED RESEARCH OR DEVELOPMENT (Not applicable)

BACKGROUND OF THE INVENTION

The present invention relates to imaging systems and, more particularly, to systems capable of imaging hidden or otherwise invisible objects. There exists a large and growing demand for devices that can detect, and display images of, hidden or otherwise invisible objects. Security applications include airport baggage screening and searching for contraband at border crossings. Military applications include detecting hidden weapons and soldiers. Public safety applications include locating victims in burning buildings. Commercial applications include locating pipes, wires or other infrastructure within walls or under roads.

Existing systems, such as x-ray and computerized tomography (CT), capable of imaging hidden objects are large and complex. These systems typically consume large amounts of energy and are typically not portable. Existing portable devices, such as electronic stud sensors, use radar or measurements of dielectric constants to detect hidden objects, however these devices provide essentially binary results, not images of the hidden objects. Existing infrared, ultrasonic and other imaging systems produce adequate images, however, these systems typically operate over relatively small dynamic ranges of signal flux or require re-calibration or relatively slow automatic gain control (AGC) circuits.

BRIEF SUMMARY OF THE INVENTION

The present invention provides methods and apparatus for acquiring signals from an object within a field of view over a wide dynamic range of signal flux using an array of directional sensors. The methods and apparatus "re-converge" signals from the sensors to create a three-dimensional image of the object, as points on the object change contrast or the object moves relative to the array of sensors (or the array of sensors moves relative to the object). The image of the object can be made visible to a user or it can be further processed, such as by a computer.

The signals from the object can be in the form of transverse or longitudinal waves, such as visible light, infrared light, radio frequency (RF), sound or ultrasound, or any other type of signal that can be detected by a sensor, such as pressure or a chemical attribute. Any combination of signal types can be used. The signals from the object can be reflected, refracted, and/or radiated from the object. In addition, signals from around a backlit object, as well as shadows cast by such an object, can be detected. The invention encompasses active embodiments, which illuminate the object and detect reflections from the object, as well as passive embodiments, which do not illuminate the object and rely on ambient illumination or radiation from the object.

Systems according to the present disclosure can include features to modify signals in ways that simplify subsequent processing of the signals. For example, sensor signals can be converted to signals representing logarithms thereof to enable systems to operate over wide dynamic ranges of flux impinging on the sensors, without requiring automatic gain control (AGC), time to adapt to changes in background flux or time to recover from overloads.

Other signal modifications can include removing unnecessary information from the signals. For example, signals can be modified so that only contrast-changing or moving objects are detected. In this context, portions of an object that change contrast over time (such as blink), as well as edges between the object and its contrasting background and edges between two contrasting portions of the object, are highlighted in the object's image, as the object changes contrast or moves relative to the array of sensors. Circuits detect changes (transients) in the signals received by the sensors from the object to detect these changes in contrast.

Another signal modifying technique involves removing background (common mode) information from the sensor signals. This can be accomplished by comparing the signal from each directional sensor to a background (ambient) signal, such as from a non-directional sensor or an average of several of the directional sensors, and retaining only differences between the compared signals.

In addition to simplifying the detected signals, systems according to the present disclosure can create images for viewing by a human or for subsequent processing by a computer or other circuit. This can be accomplished by detecting coincident transients (i.e., transients coincidentally detected by a plurality of directional sensors), determining points in the field of view where the transients occur and mapping these points to points in the image.

To detect transients in the field of view, each directional sensor is oriented along an axis toward the field of view. The directional sensors are oriented in diverse directions and collectively cover all or portions of the field of view. Outputs from the directional sensors are connected in overlapping groups to coincidence detectors in a coincidence detector matrix. Each point in the field of view where two or more directional sensor axes intersect is represented by a corresponding coincidence detector, which is connected to the two or more intersecting directional sensors. The two or more intersecting directional sensors are referred to as a "group."

If a predetermined number of the sensors in the group detects a transient within a predetermined time (or another predetermined threshold is reached), the corresponding point in the image is deemed to be "contrasty" (such as an edge point). Alternatively, contrast can be a continuous attribute of the point in the field of view. In addition, the point in the image can be labeled to indicate whether the contrast of the corresponding point in the field of view is increasing, decreasing or cycling. Contrasty points can be made visible or otherwise perceivable by a human, such as by connecting each coincidence detector to a light emitting diode (LED) or other output device. Optionally or alternatively, the outputs of the coincidence detectors can be processed by a computer or other circuit.

Several points in the field of view can lie along the axis of a first directional sensor at different distances from the sensor. Other sensors' axes can intersect the first sensor's axis at these points. Thus, the first directional sensor can detect contrast changes related to objects at various points (along the sensor's axis) in the field of view. Consequently, the first directional sensor can be a member of several groups, and the sensor can be connected to several different coincidence detectors.

Thus, systems according to the present disclosure include one or more aspects of logarithmic transient comparison re-convergence.

BRIEF DESCRIPTION OF THE SEVERAL VIEWS OF THE DRAWINGS

These and other features, advantages, aspects and embodiments of the present invention will become more apparent to those skilled in the art from the following detailed description of an embodiment of the present invention when taken with reference to the accompanying non-scale drawings, in which the first digit, or first two digits, of each reference numeral identifies the figure in which the corresponding item is first introduced and in which:

FIG. 18 is a cut-away view of a sensor cluster complex, according to another embodiment of the present invention;

FIG. 19 is a cross-sectional view of the sensor cluster complex of FIG. 18;

DETAILED DESCRIPTION OF THE INVENTION

The contents of U.S. Provisional Patent Application No. 60/494,717, titled "Vision System," filed Aug. 13, 2003, are hereby incorporated by reference herein.

The present disclosure provides methods and apparatus for acquiring signals from an object within a field of view over a wide dynamic range of signal flux using an array of directional sensors (i.e., sensors having relatively small reception angles, or what physicists would refer to as "visual angles"). The methods and apparatus "re-converge" signals from the sensors to create a three-dimensional image of the object, as points on the object change contrast or the object moves relative to the array of sensors (or the array of sensors moves relative to the object). The image of the object can be made visible to a user or it can be further processed, such as by a computer. Applications of these methods and apparatus include viewing devices that enable a user to view images of hidden or otherwise invisible objects, such as wires or pipes within a wall, hidden soldiers or contraband inside luggage.

Figure 1:
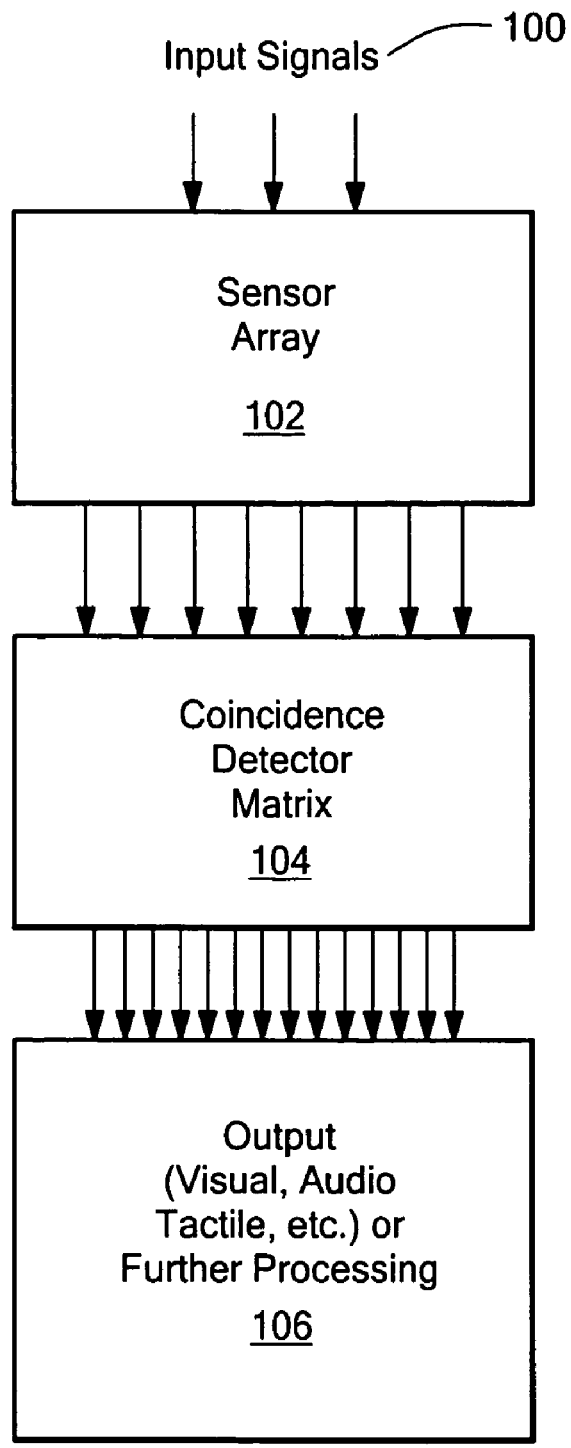
FIG. 1 is a simplified block diagram of an embodiment of the present invention.

The signals from the object can be in the form of transverse or longitudinal waves, such as visible light, infrared light, x-rays, radio frequency (RF), sound or ultrasound, or any other type of signal that can be detected by a sensor, such as pressure or a chemical attribute. As shown in FIG. 1, signals 100, such as those radiated, refracted or reflected from the object, are detected by sensors in a sensor array 102. Some of the sensors in the sensor array 102 are directional, having relatively narrow reception angles. The directional sensors are oriented such that groups of the sensors are oriented towards respective points in the field of view. A given sensor can be a member of several groups of sensors. For example, a given sensor can be simultaneously oriented toward several different points in the field of view, each point being located a different distance from the sensor array 102.

Output signals from the sensors represent the flux impinging on the sensors or are otherwise analogous to the input signals 100. The output signals from the sensors can be processed, such as to convert the sensor signals into signals representing logarithms thereof, detect transients in the sensor signals and/or compare the signals to background flux, as described in more detail below. The processed or unprocessed sensor signals are forwarded to a coincidence detector matrix 104.

The coincidence detector matrix 104 includes a plurality of coincidence detectors. Each coincidence detector corresponds to one of the groups of sensors in the sensor array 102, i.e. to a point in the field of view. The sensor signals from the sensors of each group are connected to the corresponding coincidence detector. The coincidence detector is configured to detect a coincidence of signals from its corresponding sensors, in some embodiments based on a threshold. For example, the coincidence detector can be configured to detect whether a predetermined fraction of the sensors in its corresponding group of sensors produces output signals within a predetermined time. In other embodiments, the coincidence detectors determine a degree of coincidence.

The output of the coincidence detectors can produce a user-perceivable output 106, such as by a visual display device or an audio or tactile output unit. For example, each coincidence detector can drive a point source of light, which collectively renders a three-dimensional image of objects in the field of view. Optionally or alternatively, the output of the coincidence detectors can be further processed, such as by a computer.

Implementations of the components shown schematically in FIG. 1 are described in more detail below. As noted above, systems according to the present disclosure can detect and process object signals of various types, such as visible light, sound or combinations of signals. However, for simplicity, most embodiments are described below with reference to infrared object signals. Such descriptions are presented to facilitate understanding the structure and operation of the invention, not as limitations.

Sensor Complex

Figure 2:
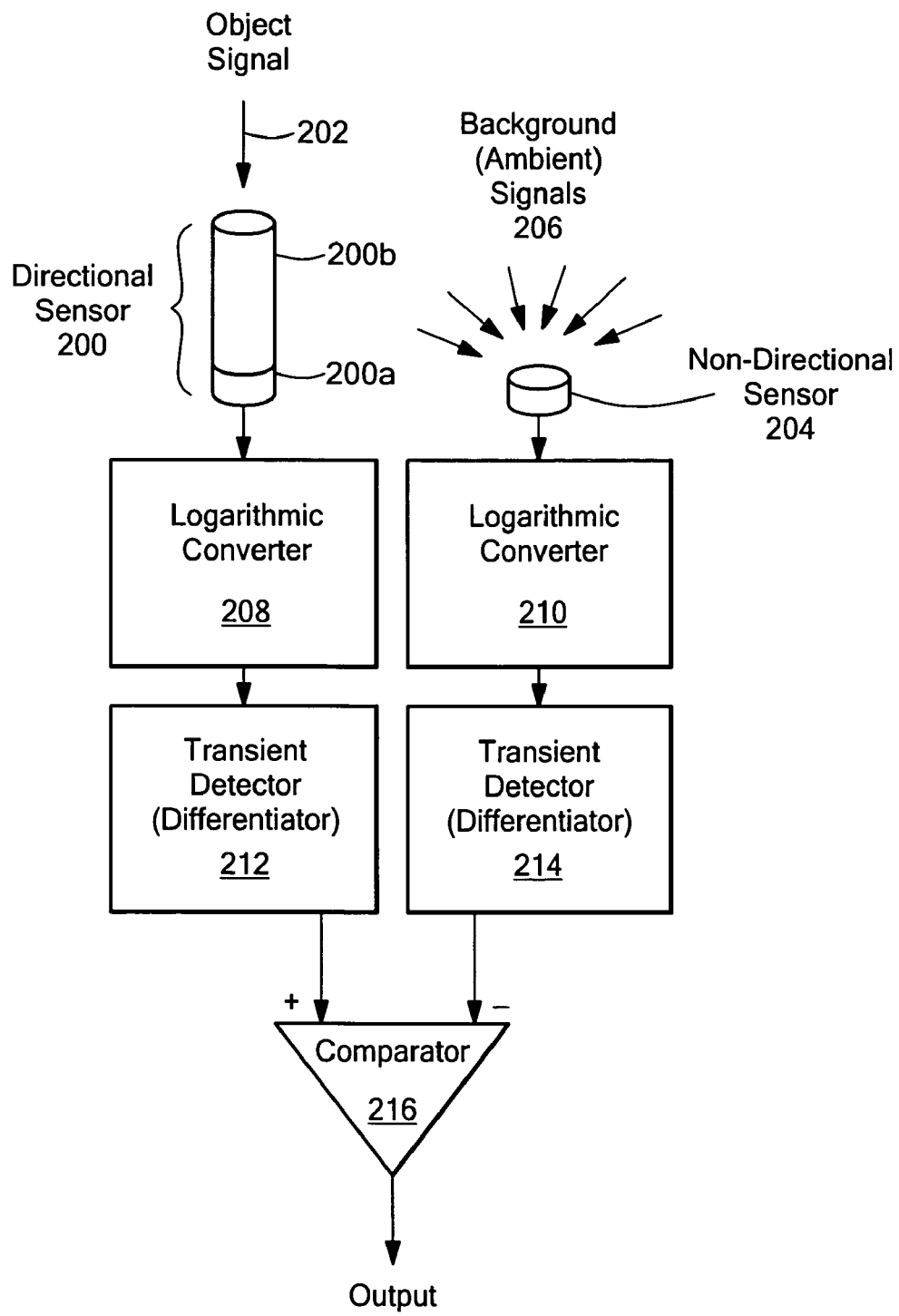
FIG. 2 is a simplified block diagram of one embodiment of a sensor complex of the sensor array of FIG. 1.

To handle a wide dynamic range of flux impinging on sensors, sensor signals can be converted to signals representing logarithms thereof. To reduce the amount of processing performed on the output signals from the sensors, only changes in the flux impinging on the sensors need to be processed. Furthermore, each sensor's output signal can be compared to a background (ambient) signal, and common mode characteristics of the sensor's signal can be discarded. FIG. 2 is a block diagram of one embodiment of a sensor complex that performs such functions. A directional sensor 200 is oriented to receive signals 202 along an axis, i.e. from a particular direction in the field of view. As noted above, many points (at different distances) in the field of view can lie along the axis of a single sensor.

The directional sensor 200 is shown as a collimated sensor, however other configurations of directional sensors are acceptable, as long as the reception angles of the sensors are sufficiently small. In one embodiment, the collimated sensor 200 includes an infrared-sensitive photodiode 200a and a tube 200b. The inside surface of the tube 200b is constructed or treated to reduce reflections, such as by painting the inside surface of the tube flat black. The length-to-diameter ratio of the tube 200b can be selected to achieve a desired reception angle of the directional sensor 200.

The sensor complex detects changes in contrast along the axis of the directional sensor 200. These changes in contrast can be caused by movement of contrasty (relative to the background) points of an object into or out of the reception angle of the directional sensor 200. For example, as points along edges of the object (as viewed against a contrasting background) move into or out of the reception angle of the directional sensor 200, the sensor complex detects these edge points. Similarly, the sensor complex can detect boundaries between two contrasting portions of the object, as points along these boundaries move into or out of the reception angle of the directional sensor 200. The sensor complex can also detect points on a stationary object that change contrast over time, such as because the points blink or because of a change in the amount of radiation illuminating the object, e.g. if the points are more reflective than the rest of the object.

As noted, the sensor complex detects differences between signals detected by the directional sensor 200 and a background (ambient) signal. A non-directional sensor 204 detects background flux 206. Alternatively, the background flux 206 can be ascertained by averaging signals from a plurality of directional sensors. If a plurality of directional sensors is used to ascertain the background flux, the sensors should be oriented in diverse directions.

Output signals from the directional sensor 200 and the non-directional sensor 204 are fed to respective logarithmic converters 208 and 210. Converting signals representing the flux impinging on the sensors 200 and 204 into signals representing logarithms thereof enables the sensor complex to operate over a wide dynamic range of flux impinging on the sensors, without requiring automatic gain control (AGC), time to adapt to changes in the background flux or time to recover from overloads. For example, sensor signals that span a 12-decade range of flux can be processed by subsequent circuits.

The outputs of the logarithmic converters 208 and 210 are fed to respective transient detectors (differentiators) 212 and 214. As noted above, only changes in the flux need to be processed. The outputs of the transient detectors 212 and 214 are fed to a comparator 216. The output of the comparator 216 represents a difference between transients detected along the axis of the directional sensor 200 and transients in the background flux. In one embodiment, the output of the comparator 216 indicates whether the sensor complex detects an increase or a decrease in contrast. Alternatively, the output of the comparator 216 simply indicates that the sensor complex detects a change in contrast, without indicating whether the contrast increased or decreased. In yet other embodiments, the signal detected by the directional sensor 200 is also fed to a subsequent circuit, as described below.

Processing transients in sensor signals makes systems insensitive to DC or slowly changing components of the signals. For example, current flowing through a photodiode slowly heats the photodiode and changes its response characteristics. This effect is commonly called "drift." However, systems according to the present disclosure are insensitive to this drift, because these systems process transients, not steady-state information, in sensor signals. Comparing changes in flux impinging on the directional sensor 200 with changes in background flux makes systems according to the present disclosure insensitive to changes in illumination on an object (assuming a uniformly reflective object). Furthermore, the ratio of the logarithms of the amount of illumination reflected from two contrasting portions of an object remains constant, even if the amount of illumination impinging on the object varies. In general, "contrast" herein means a ratio of logarithms. Although all three forms of signal processing (logarithmic conversion, transient detection and comparison) provide advantages, systems according to the present disclosure can use any combination of these signal processing techniques.

Appropriate exemplary circuits for the logarithmic converters 208 and 210, the transient detectors 212 and 214 and the comparator 216 are described below. However, other circuits that perform the above-described functions are acceptable, regardless of whether the circuits are implemented using electronic, photonic, hydraulic, molecular or other technologies. Furthermore, these functions can be implemented in hardware, software, firmware or combinations thereof.

As noted, the transients detected by the sensor complex represent contrasty points on objects, as the points move into or out of the reception angle of the directional sensor 200, or as stationary points within the reception angle change contrast. The contrasty points on the objects often correspond to points along the periphery or other edges of the objects. Detecting and displaying a plurality of these periphery or edge points, such as by a three-dimensional display device, can enable a user to identify the objects. To facilitate such detection and display, outputs of a plurality of sensor complexes are fed to a coincidence detector matrix, as discussed below.

Coincidence Detector Matrix

Outputs from the sensor complexes are connected in overlapping groups to coincidence detectors in a three-dimensional coincidence detector matrix to detect the plurality of periphery or edge points of objects. Each coincidence detector is connected to a different group of spaced-apart sensor complexes. The directional sensors in each such group are oriented and arranged in the sensor array such that they simultaneously acquire signals from a common point in the three-dimensional field of view. (The term "point" in the field of view refers to a volume of space. The volume is generally larger at progressively greater distances from the directional sensor, because the sensor's reception angle (reception cone) includes more volume at progressively greater distances.) Thus, each coincidence detector corresponds to a point in the three-dimensional field of view. If a predetermined number of these sensors detect a transient within a predetermined time (or another threshold is reached), a corresponding point is deemed to be "contrasty" (an edge point), and the point can be made visible in a three-dimensional image display. In addition, the point in the image can be displayed so as to indicate whether the contrast of the corresponding point in the field of view is increasing, decreasing or cycling. Alternatively, the coincidence detector can use a continuous or stepped scale to represent an amount of contrast change for the point in the field of view, and a visual display can display the point with a brilliance proportional to the point's contrast change or color coded to represent the contrast change. A user could then identify a more contrasty point from less contrasty points, because the point would be displayed with more or less brilliance than nearby points. Similarly, a computer or other circuit can compare a point's contrast to near by points' contrasts.

Figure 3:
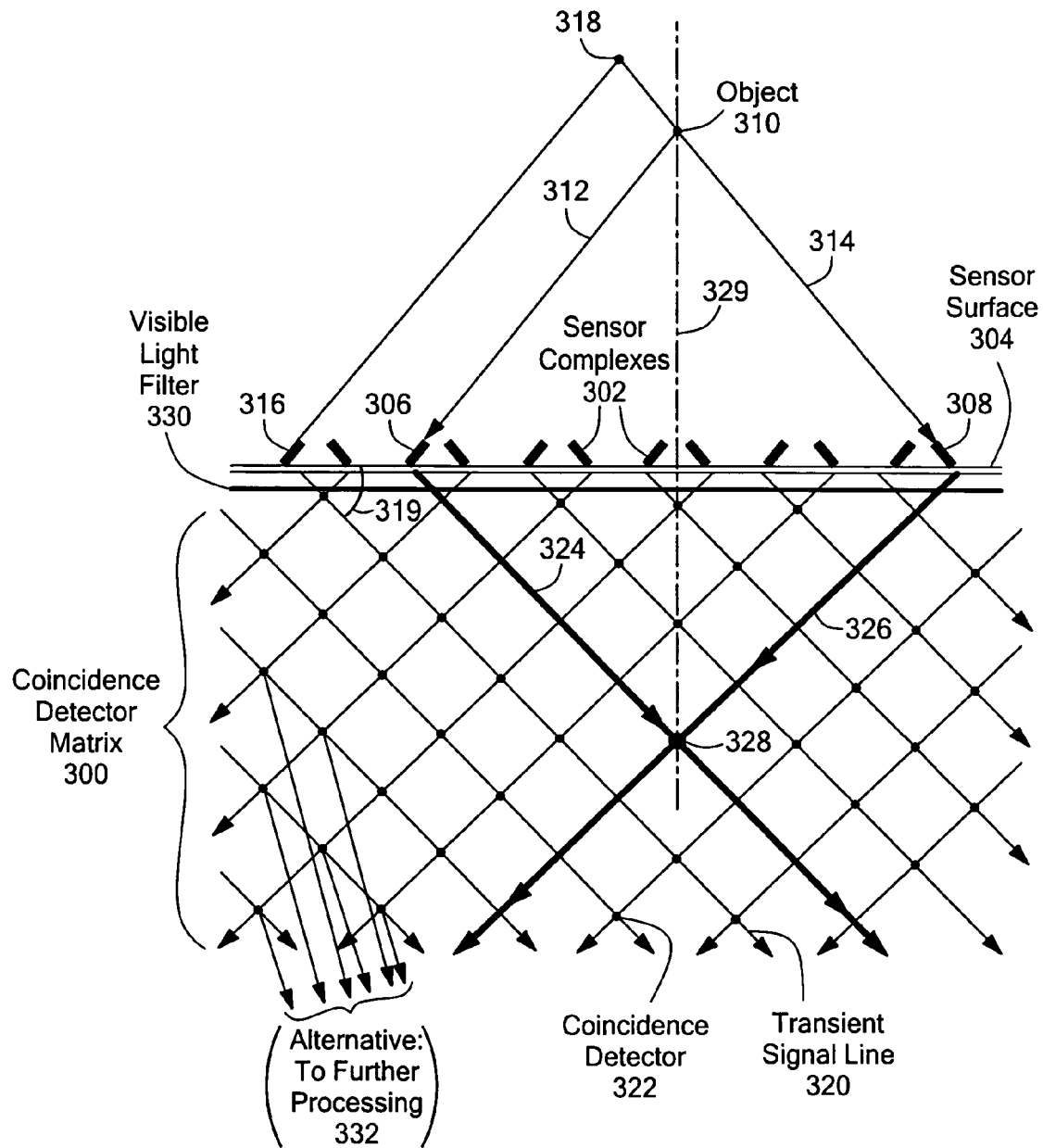
FIG. 3 is a schematic cut-away view of a portion of the sensor array of FIG. 1.

FIG. 3 is a schematic cross-sectional view of a portion of one embodiment of a coincidence detector matrix 300. A plurality of sensor complexes, such as sensor complexes 302, is arranged on a sensor surface 304. Sensor complexes can be attached to the sensor surface 304 or embedded in or below the surface. For simplicity, all these arrangements are described herein as being "on a sensor surface." Although the sensor surface 304 is shown as being flat in FIG. 3, the sensor surface can be part of a curved or other three-dimensional surface, as discussed in more detail below.

The sensor complexes are distributed over the sensor surface 304 such that the directional sensors that are parts of groups of sensor complexes are oriented towards common points in the field of view. For example, the directional sensors in sensor complexes 306 and 308 are oriented so an object (or a point of an object) 310 is within the reception angles of the respective directional sensors, i.e. signals 312 and 314 from the object are detected by the directional sensors in sensor complexes 306 and 308.

Note that each sensor complex can be a member of multiple groups. For example, sensor complex 308 is a member of a second group, which also includes sensor complex 316. The directional sensors of sensor complexes 308 and 316 are oriented toward a second object 318. Thus, each group of sensor complexes corresponds to a point in the field of view.

Output signals from the sensor complexes descend at "projection" angles, such as angle 319, into the coincidence detector matrix 300 along respective transient signal lines, such as transient signal line 320. The angle of descent of each transient signal line coincides with (but is not necessarily equal to) the angle of the axis of the respective directional signal sensor (relative to the sensor surface 304), as measured at the respective sensor complex, i.e., the "elevation" angle of the sensor.

At each point where two or more transient signal lines coincide (at a "coincidence point"), the coincidence detector matrix 300 includes a coincidence detector, such as coincidence detector 322. Transient signal lines coincide where signals from more than one sensor complex (that are caused by a common object in the field of view) occur roughly simultaneously or meet some other criteria, as discussed in more detail below. For example, transient signal lines 324 and 326 descend from respective sensor complexes 306 and 308 and coincide at a coincidence detector 328. Coincidence detector 328 corresponds to point 310 in the field of view.

All the directional sensors can be oriented at a common elevation angle. Alternatively, the directional sensors can be oriented at a variety of elevation angles. If three or more sensor complexes are distributed over a three-dimensional sensor surface, or directional sensors on a planar sensor surface are oriented at a variety of elevation angles, more than two transient signal lines can coincide at each coincidence point. If all the directional signal sensors are oriented at a common elevation angle, and signals travel along all the transient signal lines at a common speed, then coincidence points lie along a line (such as line 329) that is normal to the sensor surface and that passes through the corresponding object.

In the preceding discussion, the transient signal lines are described as descending into the coincidence detector matrix at projection angles. Embodiments can be constructed in which the transient signal lines literally descend at these angles, as described in more detail below. However, in other embodiments, the transient signal lines need not be straight. For example, in embodiments in which the transient signal lines are optical fibers, wires or other components that carry electronic signals or other structures that can carry signals over nonlinear paths, the transient signal lines can extend from the sensor complexes to the coincidence detectors at various angles or along curved paths, and the "projection angles" discussed above are used simply to ascertain the location of the coincidence detectors within the coincidence detector matrix. In yet other embodiments, in which the locations of the coincidence detectors within the coincidence detector matrix do not coincide with the coordinates of the object (for example, embodiments in which outputs from the coincidence detectors are processed by a computer, instead of being used to render a visual display within the coincidence detector matrix), these angles are simply conceptual (not necessarily physical) attributes used to associate the coincidence detectors with points in the field of view. Projections into the coincidence detector need not be along straight lines, but sensors having common elevation angles should have common projection angles.

In some embodiments, each coincidence detector is configured to produce an output signal when at least a threshold amount of signal information is received from the respective sensor complexes. For example, the coincidence detector can be configured to produce the output signal if it receives signals from at least a predetermined number of sensor complexes within a predetermined time. For example, in one embodiment, each coincidence detector is connected to seven sensor complexes. The coincidence detector produces an output signal if it receives signals from at least four of the seven sensor complexes within a 1 ms time window. In some embodiments, the length of the time window can be adjusted, e.g. by a user. Alternatively, the coincidence detector can be configured with an adjustable or a "sliding scale" threshold. For example, the coincidence detector can be configured to produce the output signal if it receives at least a relatively small number of signals from the sensor complexes within a relatively short time or if it receives a relatively large number of signals within a relatively longer time. This kind of threshold can accommodate variations in transmission rates (i.e., descent times) of the respective transient signal lines or misaligned directional sensors (where not all the directional sensors of a group receive signals from an object simultaneously).

The threshold can also be based on the magnitudes, rates or directions (i.e., increasing or decreasing contrast) of the transients detected by the sensor complexes. Coincidence detection need not be binary, and the signals from sensor complexes need not be binary. As noted, signals from sensor complexes can indicate a degree of detected contrast change, and the coincidence detectors can process these signals in a variety of ways. For example, the signal values can be summed, and the sum can be used to control the brilliance or color of a respective light source.

An appropriate exemplary circuit for the coincidence detectors is described below. However, other circuits that perform the above-described functions are acceptable, regardless of whether the circuits are implemented using electronic, photonic, hydraulic, molecular or other technologies. Furthermore, these functions can be implemented in hardware, software, firmware or combinations thereof.

Essentially, there exists a physical or logical mapping between physical or logical points in the field of view and the coincidence detectors. The coincidence detector matrix performs a transformation between physical or logical coordinates of the points in the field of view and physical or logical coordinates of a coincidence detector. For example, a coincidence detector matrix can be implemented in software using Basic Linear Algebra Subprograms (BLAS), which are building block routines for performing vector and matrix operations. In such an embodiment, matrix indices are used to represent coordinates in the field of view and in the coincidence detector matrix, and BLAS is used to translate between these sets of indices.

In some embodiments, the output signals from the coincidence detectors drive optical elements located within the coincidence detector matrix 300 (or elsewhere) to produce a three-dimensional visual image, as described in more detail below. For example, each coincidence detector output signal can drive a light emitting diode (LED), liquid crystal display (LCD) element or other light-emitting element or element that is capable of charging an optical characteristic. If the signals sent along the transient signal lines indicate whether the detected changes are increases or decreases in contrast, different color LEDs can be used to show increasing or decreasing contrast, respective. For example, red LEDs can be used to signify decreasing contrast, and green LEDs can be used to signify increasing contrast. In such an embodiment, a coincidence point that rapidly changes from increasing to decreasing (or decreasing to increasing) contrast illuminates both color LEDs in rapid succession, thereby creating an illusion of a third color.

In embodiments that produce visible displays, it can be advantageous to include a visible light filter 330 below the sensor surface 304 to prevent ambient light from contaminating the visual image, particularly if the sensor surface is translucent. Optionally or alternatively, the output signals from the coincidence detectors can be fed to a computer or other circuit for further processing, as indicated at 332. Thus, the coincidence detector matrix 300 is referred to as producing an image of objects within the field of view, whether a visual image is produced or signals are provided to a computer or other circuit.

Hand-Held Embodiment

Figure 4:
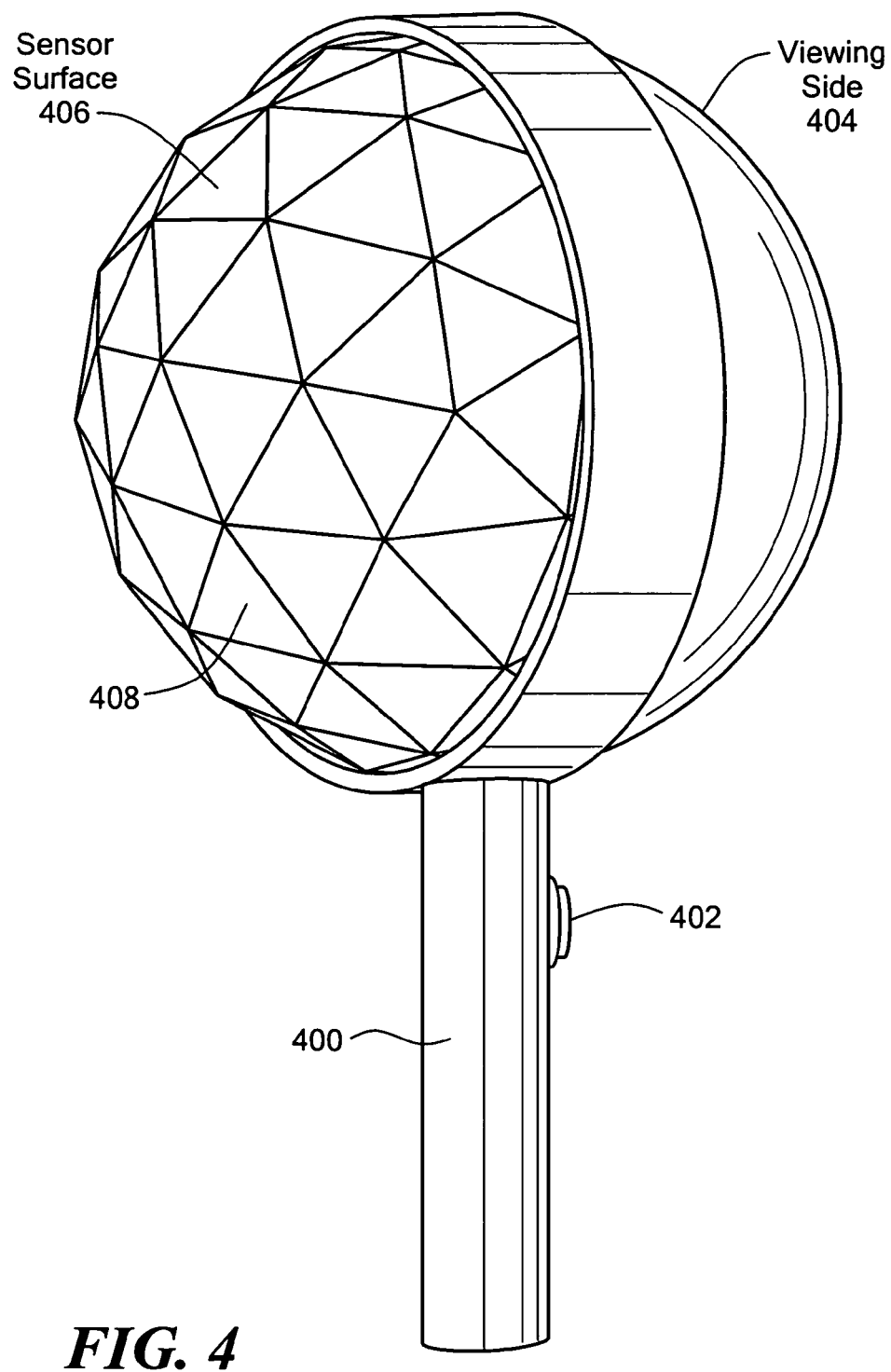
FIG. 4 is perspective view of a hand-held embodiment of the present invention.

FIG. 4 illustrates a hand-held embodiment of the present invention (i.e., a hand-held viewer), which is portable and can be readily used to detect wiring within walls, search luggage and perform other functions. The hand-held viewer resembles a magnifying glass with a thick, hollow lens having a conical hole bored through one side thereof. The hand-held viewer includes a handle 400, which can house batteries and ancillary circuits. A pushbutton power switch 402 located on the handle 400 turns the unit on and off. A viewing side 404 includes a viewing port (not visible) or other structure, by which the user can view an image produced by the hand-held viewer, as described in more detail below.

A sensor surface 406 includes a plurality of sensor complexes, such as exemplary sensor complex 408. The sensor surface 406 can be made in any of a variety of shapes. For example, the sensor surface 406 can be a portion of the surface of a sphere or other smooth shape. Alternatively, the sensor surface 406 can be planar or a portion of the surface of a regular or irregular geometric shape, such as a polyhedron. In other embodiments, the sensor surface 406 can include a plurality of regular or irregular polygonal or curved faces, on or in which the sensor complexes are mounted. Not all the faces of the sensor surface 406 need necessarily be the same size or shape. In the embodiment illustrated in FIG. 4, the sensor surface 406 is a portion of a geodesic dome. In the context of the present invention, a sensor surface, such as ones described above, on which sensor complexes can be distributed at approximately constant distances from a common point is considered to approximate a portion of a sphere.

Figure 5:
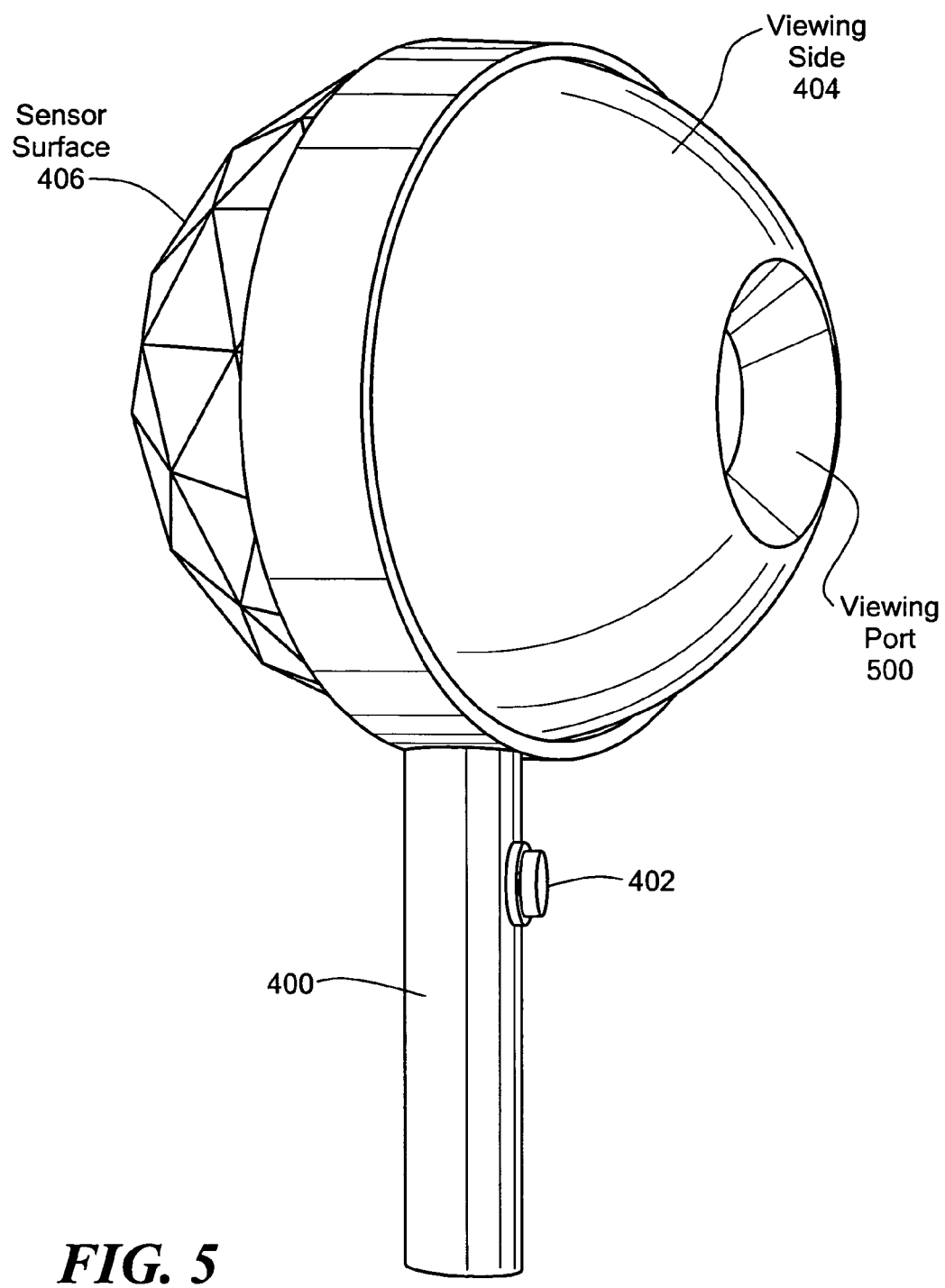
FIG. 5 is another view of the hand-held embodiment of FIG. 4.

FIG. 5 is another view of the hand-held viewer of FIG. 4 providing a more complete view of the viewing side 404. In some embodiments, the viewing side 404 includes a viewing port 500, which is described in more detail below. The sensor surface and viewing side can be made of clear plastic or other suitable material.

Coincidence Detection and Image Formation

Figure 6:
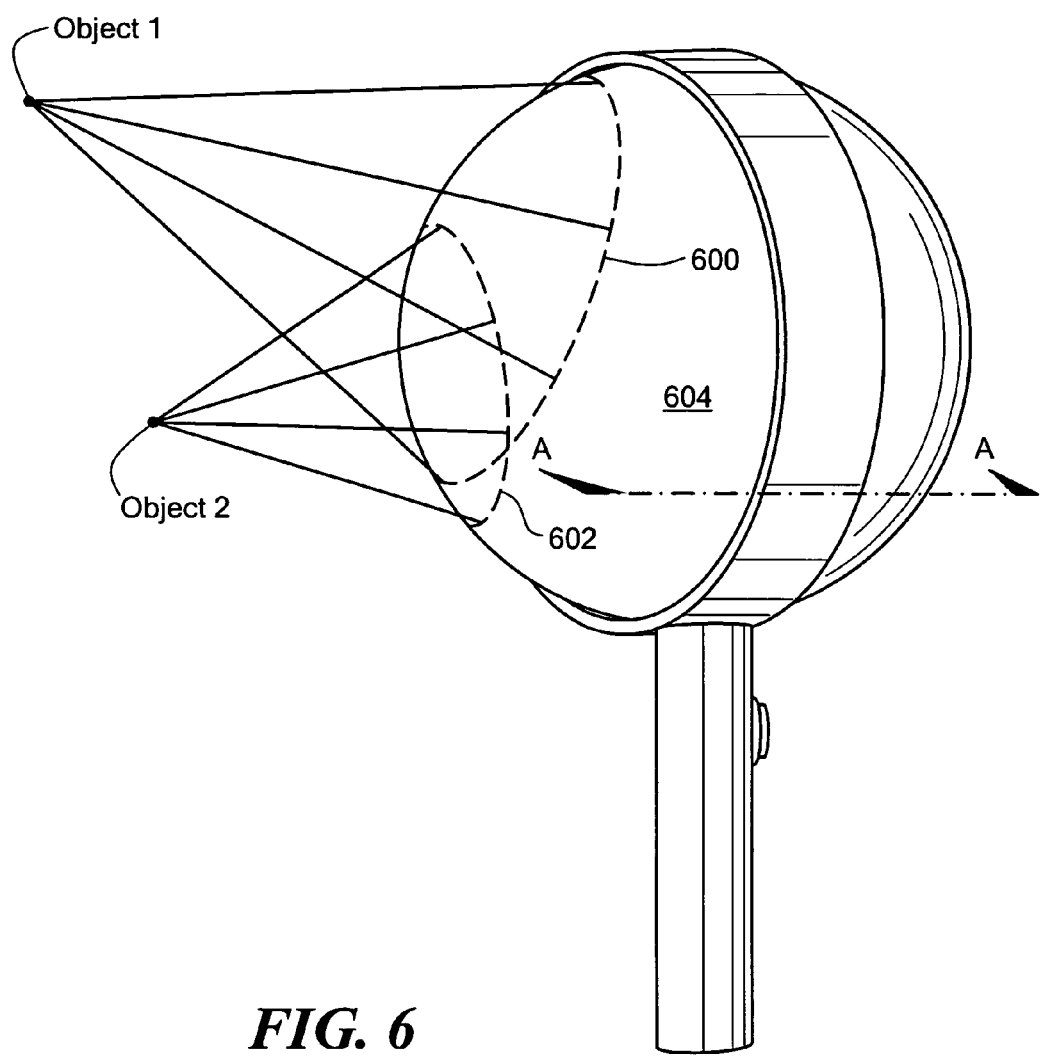
FIG. 6 is a simplified schematic diagram of groups of sensors detecting signals from objects, according to an embodiment of the present invention.

As noted above with respect to the coincidence detector matrix 300 (FIG. 3), for each point in the field of view that can be imaged, there exists a group of directional signal sensors that are oriented toward the point. FIG. 6 shows two examples 600 and 602 of such groups of directional sensors. FIG. 6 shows a smooth sensor surface 406, although other geometries can be used, as discussed above. Assuming all the directional sensors are oriented at a common elevation angle, and assuming the sensor surface is (or approximates) at least a portion of a sphere, the sensors that are oriented toward a common point in the field of view lie along at least a portion of a circle on the sensor surface. For example, the directional sensors that are oriented toward object 1 (FIG. 6) lie along a circle 600. Assuming FIG. 3 shows a cross-section of sensor surface 604 of the hand-held viewer of FIG. 6 taken through circle 600, and assuming object 1 corresponds to object 310, then sensor complexes 306 and 308 correspond to two of the directional sensors along circle 600.

Returning to FIG. 6, if all the directional sensors on sensor surface 604 are oriented at the same elevation angle, and assuming directional sensors that do not lie along circle 600 do not have reception angles that overlap reception angles of the sensors that do lie along circle 600, then only directional sensors along circle 600 acquire object signals primarily from object 1. Thus, the (one) coincidence detector that is connected to the directional sensors that lie along circle 600 is triggered when object 1 enters or leaves the reception angles of the directional sensors of circle 600 (or object 1 changes contrast while in these reception angles). Furthermore, no other coincidence detectors are triggered by this event. Even if object 1 is within the angle of reception of some directional sensors that are off circle 600, generally an insufficient number of these "off-circle" sensors will send signals to trigger other coincidence detectors.

Similarly, the directional sensors that are oriented toward object 2 lie along a different circle 602 and are connected to a different coincidence detector. As noted, a directional sensor can be oriented toward multiple points in the field of view, as discussed with respect to sensor complexes 306, 308 and 316 (FIG. 3). Such a directional sensor can, therefore, lie on multiple intersecting circles (not shown) and be connected to multiple corresponding coincidence detectors.

Figure 7:
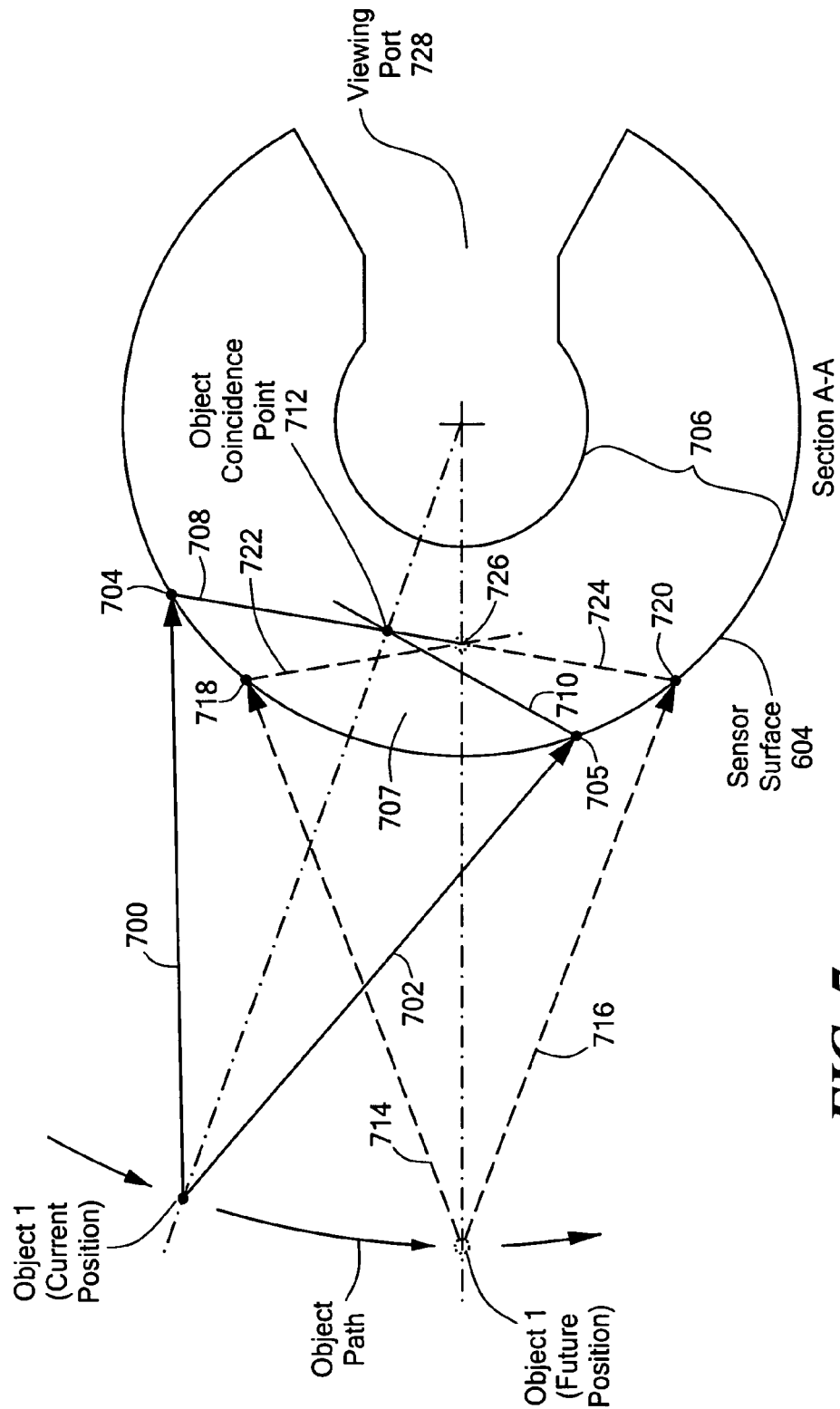
FIG. 7 is a simplified schematic cut-await view of the embodiment of FIG. 6 showing object coincidence points that correspond to objects in a field of view.

The coincidence detectors can be used to construct a three-dimensional image of objects in the field of view. In some of the embodiments discussed thus far, each coincidence detector is physically located within the three-dimensional coincidence detector matrix 300 at coordinates that correspond to coordinates of the imaged points in the field of view. FIG. 7 is a cross-sectional view of the hand-held viewer of FIG. 6 taken through circle 600, however FIG. 7 excludes object 2, and FIG. 7 shows object 1 in two positions (a current position and future position). In addition, the sensor surface 406 is shown as being smooth, although other sensor surfaces can have other shapes, as discussed above.

At the current position of object 1, signals from the object, such as signals 700 and 702, are detected by directional sensors on circle 600 (FIG. 6), such as sensors 704 and 705. A layer 706 below the sensor surface 604 contains a coincidence detector matrix 707, similar to the coincidence detector matrix 300 discussed above with reference to FIG. 3. Sensor complexes associated with sensors 704 and 705 send signals along transient signal lines 708 and 710, respectively, as discussed above. These signals coincide at an object coincidence point 712 and trigger a coincidence detector located at (or connected to) the coincidence point.

As object 1 moves along an object path, different groups of directional sensors detect signals from the object. For example, when object 1 reaches a future position, object signals 714 and 716 are detected by directional sensors along a different circle (not shown) on the sensor surface, such as sensors 718 and 720. Sensor complexes associated with sensors 718 and 720 send signals along transient signal lines 722 and 724, respectively. These signals coincide at a different object coincidence point 726 and trigger a different coincidence detector. Thus, the coincidence point that corresponds to object 1 in the coincidence detector matrix 707 changes position in a manner analogous to the movement of the object in the field of view, and the image produced by the coincidence detector matrix 707 similarly changes. In addition, if output signals from the coincidence detectors produce a visible display (as discussed above), the visible image of object 1 changes in a way that corresponds to the movement of the object. The visible image can be observed through a viewing port 728.

Figure 8:
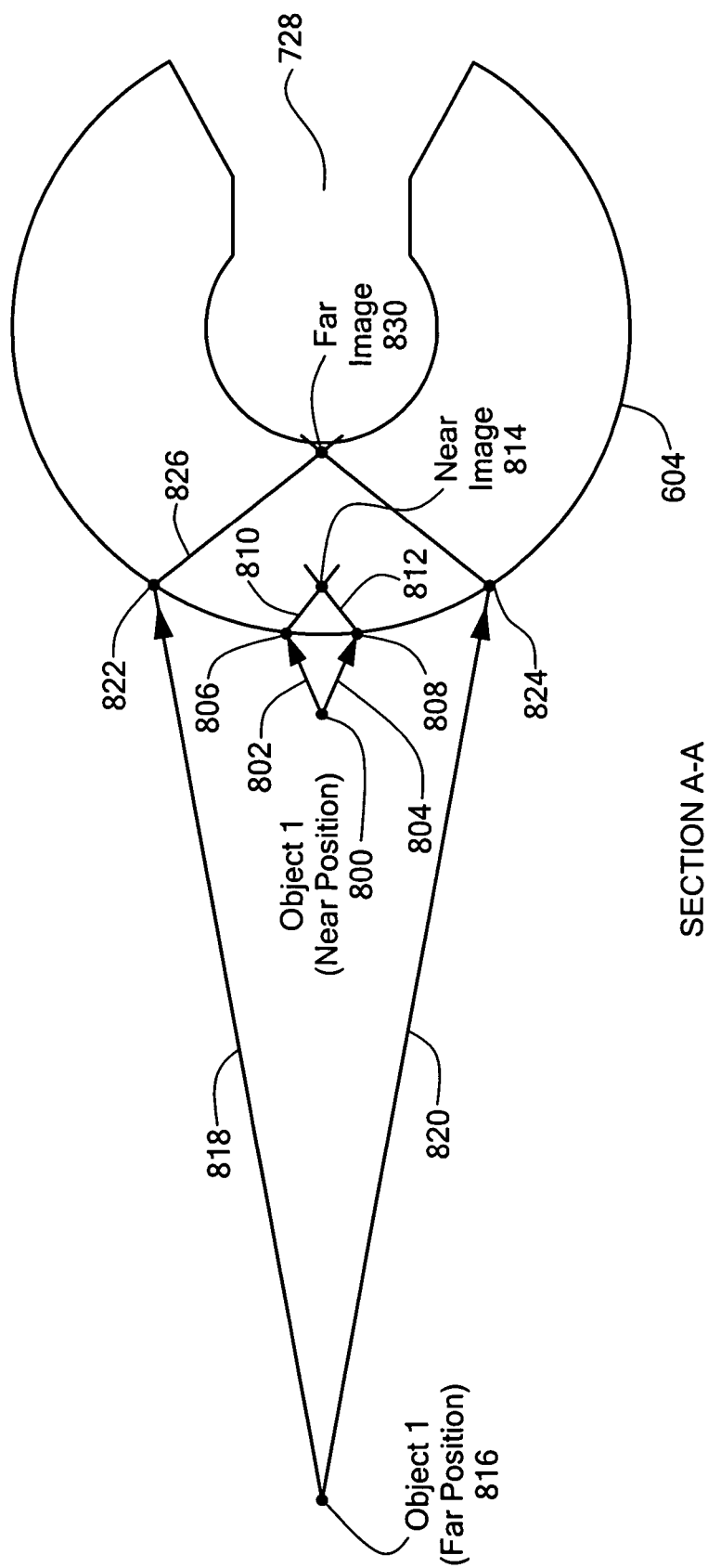
FIG. 8 is a simplified schematic cut-away view of the embodiment of FIG. 6 showing correspondence points of near and far objects in the field of view.

As object 1 moves along a path at a constant distance from the sensor surface 604, the corresponding coincidence points occur on what can be considered a surface at a constant depth below the sensor surface within the detector matrix 707. Similarly, as object 1 moves so the distance between the object and the sensor surface 604 changes, corresponding coincidence points occur at correspondingly varying depths within the detector matrix 707, as illustrated in FIG. 8. For example, when object 1 is in a near position 800, object signals 802 and 804 are detected by directional sensors in sensor complexes 806 and 808, respectively. These sensor complexes send signals along transient signal lines 810 and 812, respectively. These signals coincide at a near image coincidence point 814 and trigger a coincidence detector. On the other hand, when object 1 is in a far position 816, object signals 818 and 820 are detected by directional sensors in sensor complexes 822 and 824, respectively. The sensor complexes send signals along transient signal lines 826 and 828, respectively. The signal lines coincide at a far coincidence point 830 and trigger a different coincidence detector.

Figure 9:
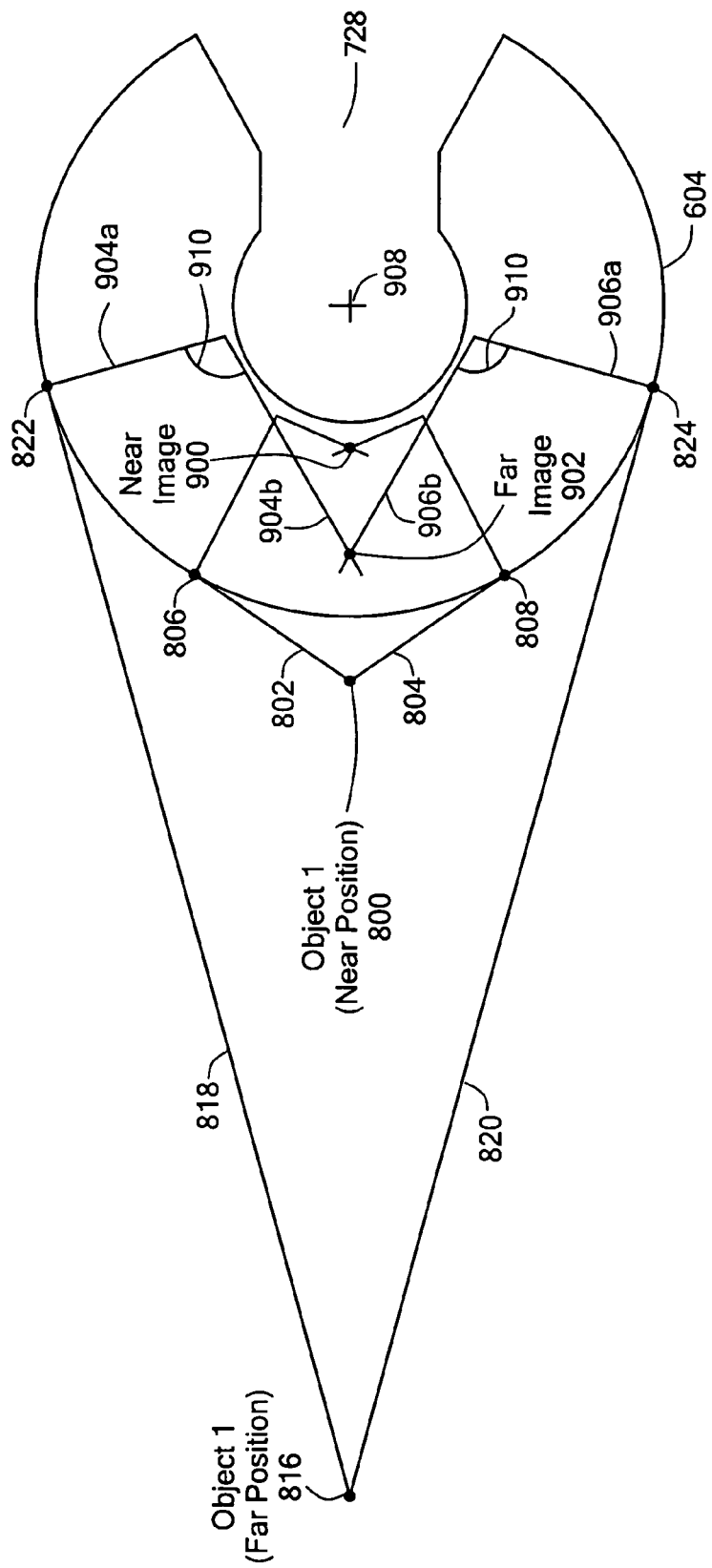
FIG. 9 is a simplified schematic cut-away view of another embodiment showing correspondence points of near and far objects in the field of view.

In the embodiment shown in FIG. 8, the near and far image coincidence points 814 and 830 occur in a spatial relation, as seen from the viewing port 828, that is opposite the spatial relation of object 1 in its near and far positions 800 and 816, relative to the sensor surface 604. That is, the far image 830 is closer to the viewing port 728 than the near image 814. Thus, the image produced by the embodiment of FIG. 8 requires some interpretation. An alternative embodiment, shown in FIG. 9, produces an image in which the spatial relation of near and far image coincidence points 900 and 902 is the same as the spatial relation of object 1 in its near and far positions, respectively. In this alternative embodiment, transient signal lines 904a and 906a descend radially from sensor complexes 822 and 824 toward the center 908 of the device, then continue at a angle 910 along continuations 904b and 906b of the transient signal lines. Transient signal lines from other sensor complexes are similarly configured.

Detecting coincident signals to create an image of objects in a field of view is referred to herein as re-convergence. Embodiments of the disclosed coincidence detector have a plurality of invariant coincidence points, each coincidence point corresponding to a point in the field of view. These points are invariant, in that they do not change under varying illumination conditions, in the face of failed detectors or other variations. Whereas a parabolic reflector has a single, invariant focal point, embodiments of the disclosed system can be though of as having a plurality of focal points, one for each coincidence point.

Viewing Port

Figure 10:
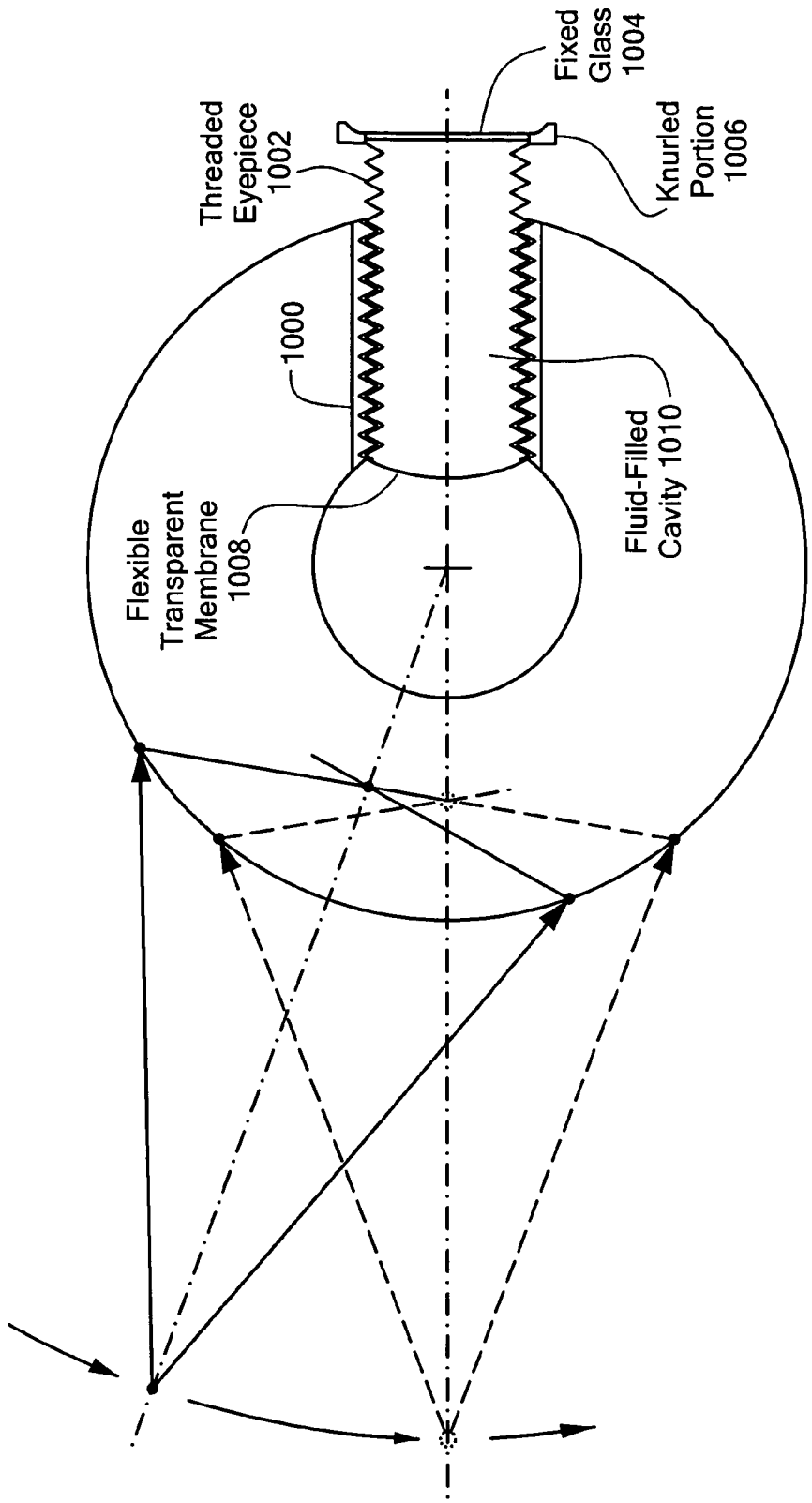
FIG. 10 is a simplified schematic cut-away view of an adjustable eyepiece, according to one embodiment of the present invention.
Figure 11:
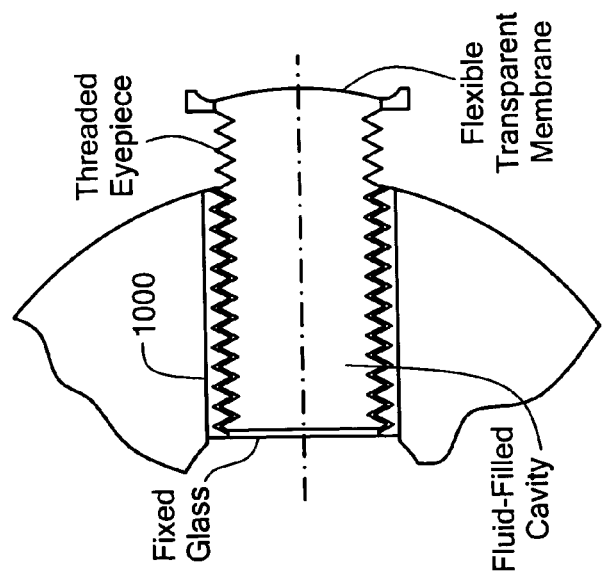
FIG. 11 is a simplified schematic cut-away view of an adjustable eyepiece, according to another embodiment of the present invention.

Visible images produced within the coincidence detector matrix 707 can be viewed through the viewing port 728, which in some embodiments is simply an aperture. Optionally, the viewing port 728 can be fitted with an eyepiece, camera, or other optics. One such embodiment is shown in FIG. 10. A threaded portion 1000 is fitted with a threaded eyepiece 1002 having a fixed lens 1004 and a knurled portion 1006. The knurled portion 1006 facilitates adjusting the threaded eyepiece 1002 by threading it into or out of the threaded portion 1000. A flexible transparent membrane 1008 is attached to an end of the threaded portion 1000. A cavity 1010 is defined within the threaded eyepiece 1002 and threaded portion 1000. The cavity is bounded by the fixed lens 1004 and the flexible transparent membrane 1008 and is filled with a transparent, relatively incompressible fluid. Alternatively, the cavity 1010 is filled with gas. As the threaded eyepiece 1002 is threaded into or out of the threaded portion 1000, the relatively incompressible fluid or the gas deforms the flexible transparent membrane 1008 to take on various convex or concave shapes, and thus becomes an adjustable lens. Alternatively, as shown in FIG. 11, the positions of the fixed lens and the flexible transparent membrane can be swapped. Such an eyepiece can give a user an illusion of observing the visual display from the center of the device.

Object Images

As noted, images produced by embodiments of the invention identify contrast-changing points in the field of view. These points can be edge points of objects, as the objects move relative to a contrasting background. These points can also be points along a boundary between contrasting portions of the objects, as the objects move within the field of view. These points can also be points that change contrast (such as blink) on stationary objects. As noted above, light emitting elements, such as LEDs, can be used to make these points visible.

Figure 12:
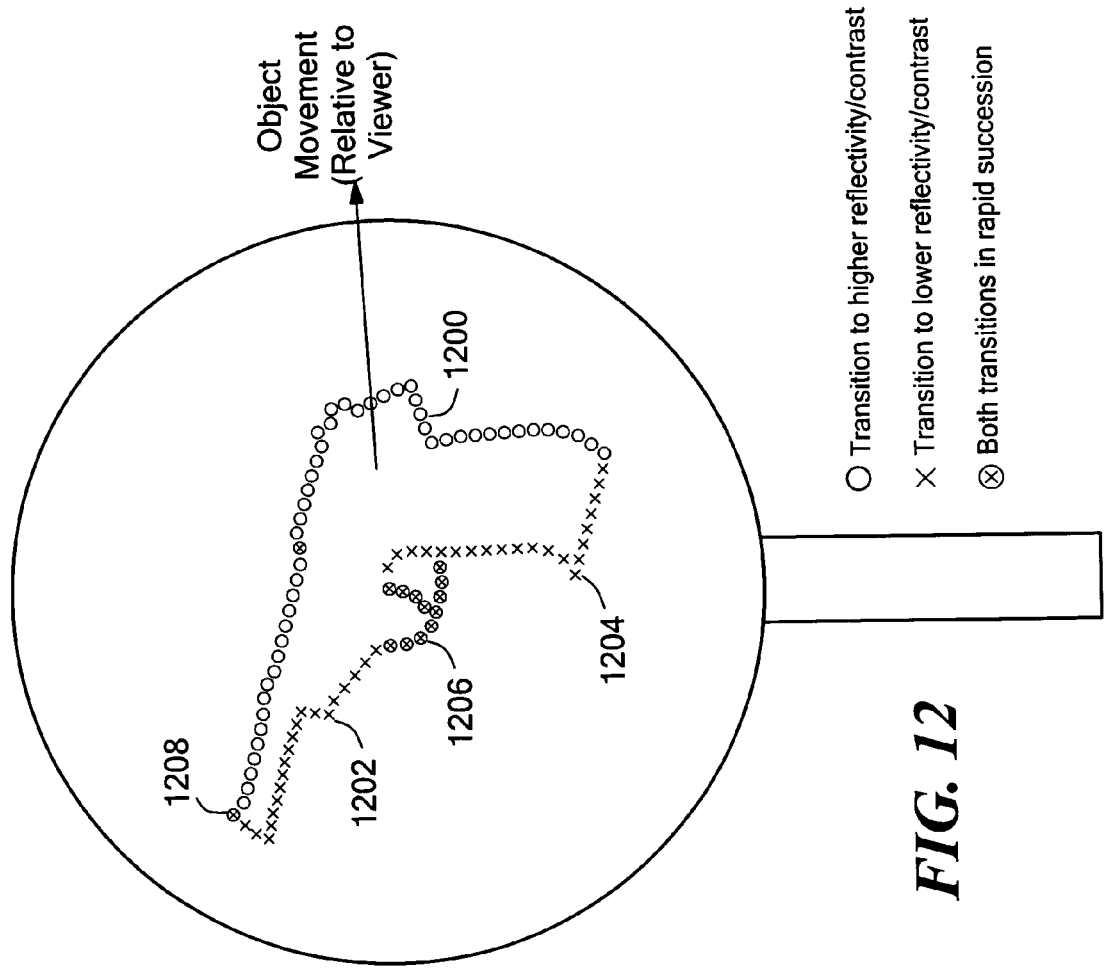
FIG. 12 is a schematic diagram representing an image displayed by an embodiment of the present invention.

FIG. 12 illustrates an exemplary display of an object created by an embodiment of the disclosed system. In FIG. 12, the object is moving to the right, relative to the viewing device. (Of course, the object can be stationary, and the viewing device can be moving to the left, relative to the object.) Each point within the field of view that is transitioning to a higher reflectivity or contrast is indicated by an open circle (○). For example, these points can be displayed in a first color. Each point that is transitioning to a lower reflectivity or contrast is indicated by an X. For example, these points can be displayed in a second color. Each point at which both types of transitions occur within a relatively short time is indicated by an X within a circle. For example, these points can be displayed in both colors simultaneously or in rapid succession, giving the illusion of a third color. For example, red and green LEDs can give an illusion of a yellowish light.

Assuming the object has a surface that is higher in contrast or more reflective than the background, as the object moves to the right, a leading edge 1200 of the object is displayed as a plurality of open circles. Trailing edges 1202 and 1204 of the object are displayed as pluralities of Xs. Thin lines 1206 on the object and small protrusions, such as 1208, are displayed in both colors, because these points are displayed as transitions to a higher reflectivity or contrast and then almost immediately they are displayed as transitions to a lower reflectivity or contrast (or vice versa). Using such a display, a user can readily identify the object.

Logarithmic Converter Circuit

Figure 13:
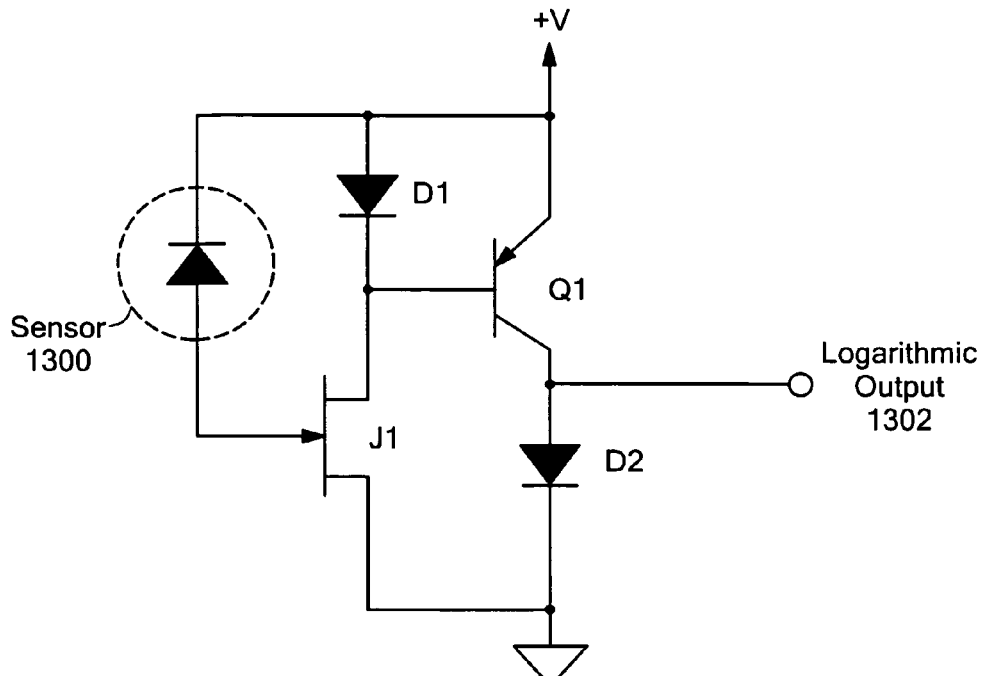
FIG. 13 is a simplified circuit diagram of a logarithmic converter, according to one embodiment of the present invention.

As noted above, some embodiments convert sensor signals to signals representing logarithms thereof to enable these embodiments to handle a wide dynamic range of flux impinging on the sensors. FIG. 13 is a simplified schematic diagram of an exemplary logarithmic converter that can be used in such embodiments. A sensor, such as the directional or non-directional sensors discussed above, is represented by a diode 1300. A charge displacement proportional to flux impinging on the sensor flows through the sensor. The gate of junction field effect transistor (JFET) J1 acts like a non-leaky capacitor. A voltage across diode D1 is approximately equal to a logarithm of the charge displaced through the sensor 1300. The voltage across diode D1 is equal to the voltage across the emitter and base of transistor Q1, thus current flowing through transistor Q1 is proportional to current flowing through diode D1. Consequently, the voltage across diode D2 is logarithmic to charge displaced by the sensor 1300, and the voltage across diode D2 is made available as a logarithmic output 1302. The gate of the JFET J1 is very sensitive to signals and noise. Gate wiring should, therefore, be shielded, according to standard practices.

Photodiodes and other sensors can typically operate in one of a plurality of modes. For example, photodiodes can operate in a current mode, where a closed-circuit current produced by the photodiode has a non-linear relationship to the amount of flux impinging on the photodiode. In a voltage mode, an open-circuit voltage produced by the photodiode has a non-linear relationship to the amount of flux impinging on the photodiode. In a charge displacement mode, an open-circuit charge displacement has a linear relationship to the amount of flux impinging on the photodiode. Embodiments of the presently disclosed system can utilize sensors operated in either of these modes, although linear operation is preferred.

As is well-known to those of skill in the art, variations on the schematic shown in FIG. 13 are possible. For example, although transistor Q1 is shown as a PNP transistor, the circuit can be rearranged to use an NPN transistor by exchanging the positions of transistor Q1 and diode D2. Alternatively, the positions of diode D1 and JFET J1 can be interchanged. In another alternative, the NJFET can be replaced by a PJFET by changing the direction of the sensor 1300. Furthermore, combinations of these alternatives can also be employed. Although one node of the sensor 1300 is shown connected to +V, any constant voltage, such as −V, ground or sink, is acceptable. Furthermore, the sensor 1300 and JFET J1 can be replaced by a photo FET, which can also provide "real estate" savings, if the logarithmic converter is fabricated as part of an integrated circuit (IC).

Transient Detector and Comparator Circuits

Figure 14:
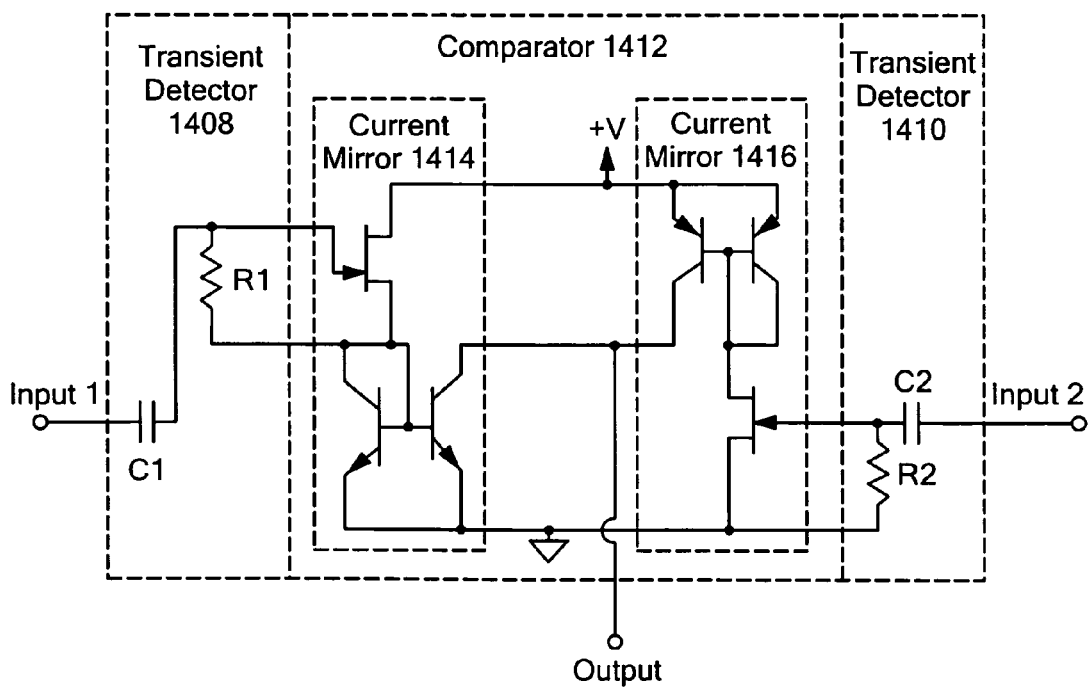
FIG. 14 is a simplified circuit diagram of a transient detector and comparator, according to one embodiment of the present invention.

As noted above with respect to FIG. 2, in some embodiments, signals from a directional sensor are compared to a background signal. Furthermore, in some embodiments, transient detectors detect changes in signals from the directional sensor and a non-directional sensor or other background signal. FIG. 14 is a simplified schematic diagram of two exemplary transient detectors 1408 and 1410 having inputs 1 and 2, respectively, and an exemplary comparator 1412 that can be used in such embodiments. Signals from directional sensors and background signals, such as from non-directional sensors or averages of several directional sensors, can be fed to inputs 1 and 2, respectively, either directly or through respective logarithmic converters. Each transient detector 1408 and 1410 includes a capacitor C1 and C2, respectively, and a resistor R1 and R2, respectively. The capacitors C1 and C2 AC-couple the input signals to the comparator 1412. The capacitors cause transient detection, essentially by taking a derivative of voltage over time. The resistors R1 and R2 drain the capacitors C1 and C2, respectively, of transient charges.

Outputs from the transient detectors 1408 and 1410 are fed to comparator 1412. The comparator 1412 includes two back-to-back current mirrors 1414 and 1416. The output of the comparator 1412 is taken from a junction of the outputs of the two current mirrors 1414 and 1416.

Figure 24:
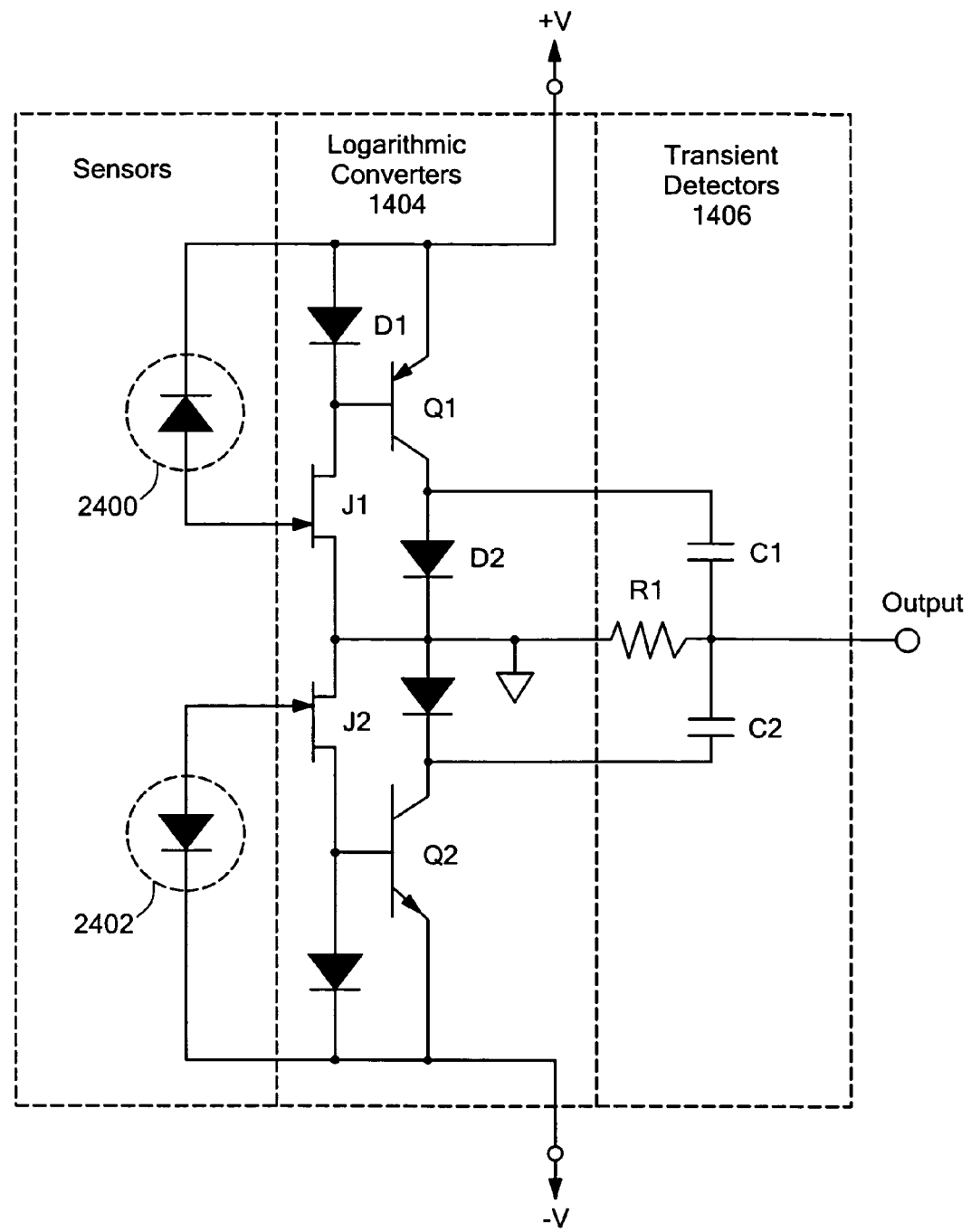
FIG. 24 is a simplified schematic diagram of a logarithmic converter, transient detector and comparator, according to another embodiment of the present invention.

FIG. 24 is a simplified schematic diagram of an alternative embodiment, which is simpler than the embodiment of FIG. 14. Two sensors 2400 and 2402 are connected to respective logarithmic converters 1404, as previously discussed, except the lower logarithmic converter is a mirror image of the upper logarithmic converter. For example, Q1 is a PNP transistor, whereas Q2 is an NPN transistor. The transient detectors 1406 include two capacitors C1 and C2 and a common drain resistor R1. A differential output is provided at the junction of the capacitors C1 and C2.

The schematic of FIG. 24 can be yet further simplified. For example, sensor 2402 and JFET J2 can be eliminated. In this case, the junction between J1 and J2 is not connected to ground. The bases of transistors Q1 and Q2 are connected to the source and drain, respectively, of JFET J1. The output signal is either a positive or negative signal (or a positive-going or a negative-going pulse), depending on whether the sensor 2400 detects an increase or decrease in contrast or reflectivity. The magnitude of the signal can indicate an amount by which the contrast of the point changes.

Figure 26:
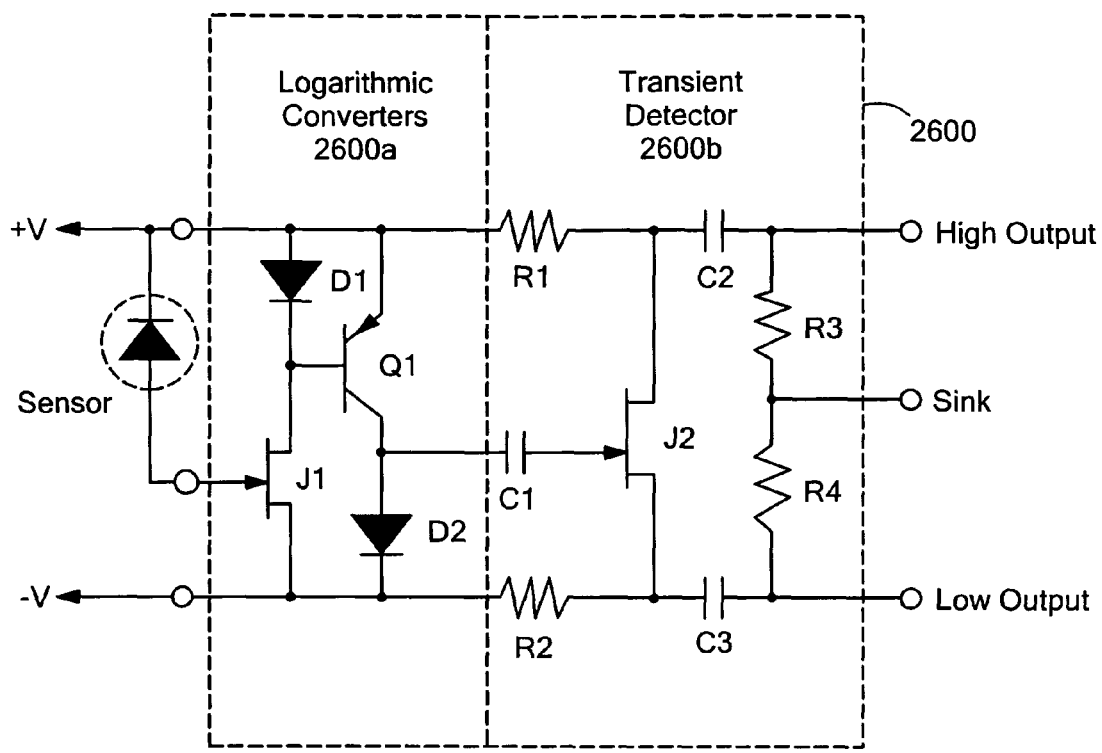
FIG. 26 is a simplified schematic diagram of a logarithmic converter and transient detector, according to another embodiment of the present invention.
Figure 27:
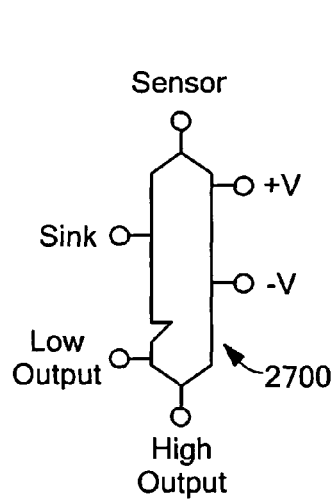
FIG. 27 is a circuit symbol of the logarithmic converter and transient detector of FIG. 26.

FIG. 26. is a simplified schematic diagram of an alternative logarithmic converter/transient detector 2600. The output from a logarithmic converter 2600a (similar to the logarithmic converter of FIG. 13) feeds a transient detector 2600b by way of a capacitor C1 and a JFET J2, which is suspended in voltage between two resistors R1 and R2. (Alternatively, two pairs of anti-parallel diodes, or any appropriate circuit elements that can have a variable voltage expressed between them, can be used in place of the resistors R1 and R2.) As the flux impinging on the sensor changes, the voltages on the source and drain of the JFET J2 change. These voltages changes are equal, but opposite. Capacitors C2 and C3 AC-couple the transient signals to respective high output and low output ports. Resistors R3 and R4 drain the capacitors C2 and C3. If a transient to a higher flux occurs, a positive signal is delivered at the high output port and a negative signal is delivered at the low output port. On the other hand, if a transient to a lower flux occurs, a negative signal is delivered at the high output port and a positive signal is delivered at the low output port. For simplicity, the circuit of FIG. 26 can be represented by a circuit symbol 2700 shown in FIG. 27.

Figure 28:
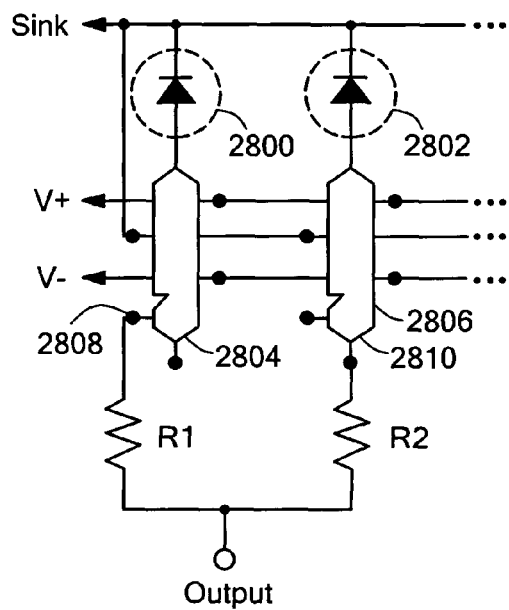
FIG. 28 is a simplified schematic diagram of a comparator using the logarithmic converter and transient detector of FIG. 26, according to one embodiment of the present invention.

FIG. 28 is a simplified schematic diagram of a comparator. Two sensors 2800 and 2802 are connected to two logarithmic converter/transient detectors 2804 and 2806, respectively. The low output port 2808 of one converter/detector 2804 and the high output port 2810 of the other converter/detector 2806 are connected to a resistor network consisting of R1 and R2. The output of the comparator is taken at the junction of the resistors R1 and R2.

As is well-known to those of skill in the art, variations on the schematics shown in FIGS. 14, 24, 26 and 28 are possible. For example, although current mirror 1414 a shown with NPN transistors and current mirror 1416 a shown with PNP transistors, other circuits are possible. The JFET J2 of FIG. 26 can be replaced with any component or combination of components that alters its resistance in an approximately linear relation to an input signal. Furthermore, the current mirror can be constructed of transistors of opposing majority carriers, i.e. FETs. Other variations, such as those discussed with reference to FIG. 13, are also possible.

Coincidence Detector Circuit

Figure 15:
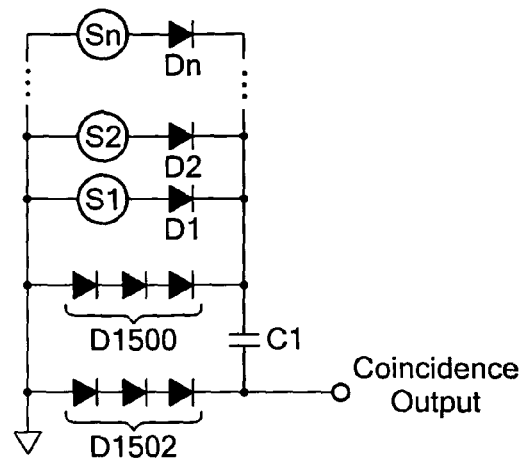
FIG. 15 is a simplified circuit diagram of a coincidence detector, according to one embodiment of the present invention.

As noted above with respect to FIG. 3, in some embodiments, coincidences of signals from a plurality of sensor complexes are detected, based on threshold criteria. In other embodiments, coincidences are continuous measurements. FIG. 15 is a simplified schematic diagram of a coincidence detector. A plurality of sensor complexes S1, S2, . . . Sn are connected in series with respective diodes D1, D2, . . . Dn. The sensor complex-diode combinations are connected together in parallel to a group of three diodes D1500. Each of the sensor complexes S1, S2, . . . Sn produces a charge displacement indicating a detected transient. In some embodiments, the transient indications are unipolar, i.e. they indicate only that a transient is detected. In other embodiments, the transient indications are by bipolar, i.e. one polarity indicates an up transient, and an opposite polarity indicates a down transient. As noted, these signals can all have a common magnitude, or the signals' magnitudes can indicate degrees of contrast changes. In either case, the transient detection signals from the sensor complexes S1, S2, . . . Sn charge capacitor C1.

In one embodiment, if at least a predetermined number of sensor complexes S1, S2, . . . Sn produce coincidence transient detection signals within a predetermined time window, the charge displacements from the sensor complexes accumulate on the capacitor C1, and the voltage across the capacitor reaches a predetermined threshold ("trigger") value. The voltage across the capacitor C1 is available at the coincidence output port to drive a subsequent circuit, such as a Schmidt trigger, a four-layer diode with leads to all four layers (such as a Shockley diode or a silicon control switch (SCS)) or other voltage threshold detector (not shown). Leakage current through a second group of three diodes D1502 discharges the capacitor C1, so the coincidence output signal lasts a finite amount of time, resetting the coincidence detector.

If, however, fewer than the predetermined number of sensor complexes S1, S2, . . . Sn produce transient detection signals within the time window, the capacitor C1 does not reach the trigger value, because an insufficient number of charge displacements accumulate on the capacitor. The charges that do accumulated on the capacitor C1 leak off the capacitor through the three diodes D1502, resetting the coincidence detector.

Similarly, if the predetermined number of sensor complexes do produce transient detection signals, but over a time period that exceeds the time window, then the capacitor C1 does not reach the trigger value, because charges accumulated on the capacitor leak off through the three diodes D1502 faster than charges are added to the capacitor.

Thus, the reverse current characteristics of the three diodes D1502 and the number of these diodes determine a maximum time window over which the coincident transients must occur, and the trigger voltage determines the minimum number coincident transients that must occur, to trigger the coincidence detector. Other numbers of diodes can, of course, be used.

In embodiments that utilize ranges of contrast values, the circuit of FIG. 3 (without a voltage threshold detector) produces a voltage within a range, the voltage being related to the amount of contrast change. Furthermore, all or parts of the coincidence detector can be implemented in more complex circuits, software, firmware or combinations thereof. Such embodiments can provide more complex response curves to the signals from the sensor complexes.

Sensor Complex Clusters

Figure 16:
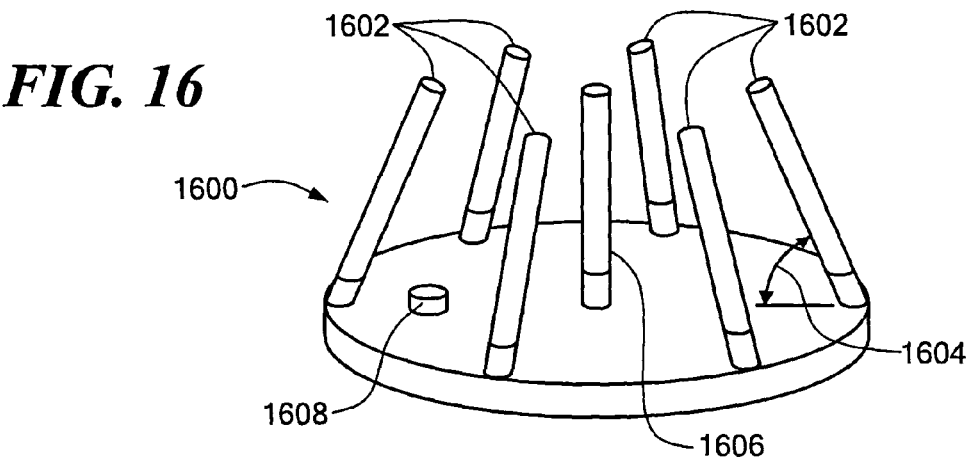
FIGS. 16 and 17 show two embodiments of sensor complex clusters, according to two embodiments of the present invention.

Sensor complexes, each of which includes a directional sensor and a non-directional sensor, are described above with reference to FIG. 2. Alternatively, a plurality of directional sensors can be combined in a "detector cluster," as shown in exemplary embodiments depicted in FIGS. 16 and 17. FIG. 16 shows a detector cluster 1600 having a plurality of directional sensors 1602 arranged in a ring, each sensor being oriented at an elevation angle 1604 relative to a sensor surface. These directional sensors 1602 surround another (optional) directional sensor 1606, which is oriented normal to the sensor surface. Optionally, the detector cluster 1600 includes a common, non-directional sensor 1608 for detecting background (ambient) flux. Signals from the common, non-directional sensor 1608 can be compared with signals from each of the directional sensors 1602 and 1606, as described above. Alternatively, the non-directional sensor 1608 can be omitted, and an average of the directional sensors 1602 can be used to detect the ambient flux. The projection angle for the central directional sensor 1606 is, of course, different than the projection angle for the inclined directional sensors 1602.

Figure 17:
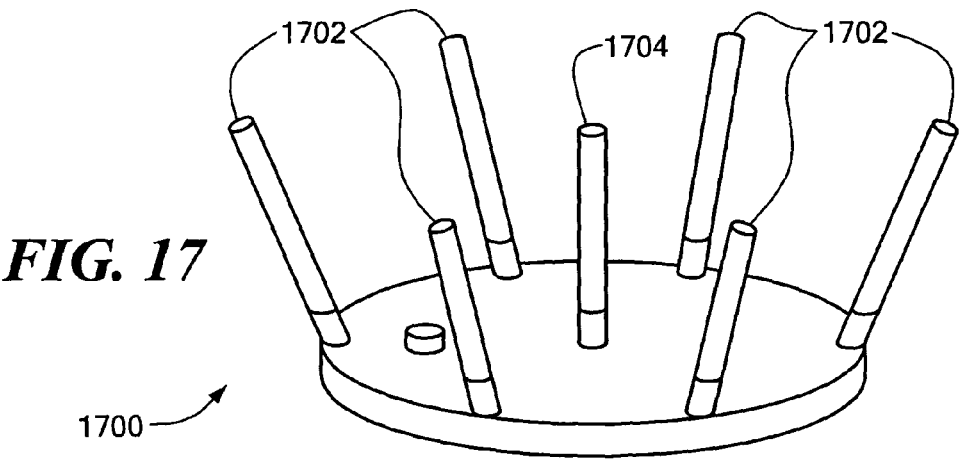

Detector cluster 1700, depicted in FIG. 17, is similar to the one depicted in FIG. 16, except the directional sensors 1702 are oriented away from, rather than towards, a normal to the sensor surface. Other combinations of directional sensors are acceptable. For example, a sensor cluster can include some directional sensors oriented away from the normal and other directional sensors oriented toward the normal. In other embodiments, the sensors' orientation can include a component tangent to the ring.

FIG. 18 depicts a cutaway view of another embodiment of a sensor cluster. This sensor cluster includes a plurality of parallel, collimated sensors, such as collimated sensors 1800 and 1802, and at least one lens. Each collimated sensor includes a collimator and a photodiode. For example, collimated sensor 1800 includes collimator 1800a and photodiode 1800b, as described above with reference to FIG. 2. The lens(es) is (are) arranged so that an object signal 1808 from an object 1810 (that is within the reception angle of the directional sensor 1800) is refracted down the collimator 1800 to the photodiode 1800b. Furthermore, object signals arriving at different angles or from different directions are refracted down different collimators, as shown. The embodiment shown in FIG. 18 includes two lenses. Lens 1804 is a biconvex lens, and lens 1806 is a plano-convex lens. In the embodiment of FIG. 18, the lenses 1804 and 1806 are net convex, and the indexes of refraction of the respective lenses are such that the axis of each directional sensor crosses a normal line (not shown) drawn through the center of the lenses. In this embodiment, lenses 1804 and 1806 have different indexes of refraction. As noted above with reference to FIG. 3, output signals from sensor complexes can descend into a coincidence detector matrix at angles. Output signals 1812 and 1814 from the collimated sensors 1800 and 1802, respectively, are shown descending into a coincidence detector matrix (not shown). In embodiments where the lens(es) is (are) net concave, the axes of the collimated sensors are oriented away from the normal through the center of the lens(es).

FIG. 19 is a cross-sectional view of the sensor cluster of FIG. 18. In this embodiment, six collimated sensors (indicated by circles 1-6) are included in the cluster, however other embodiments can include other numbers of collimated sensors. Although the sensors shown in FIG. 19 are arranged around a central point, other arrangements are acceptable. In other embodiments, one or more central collimated sensors can be included, a shown by dashed circle 7. Arrows 1-6 indicate the general directions in which output signals from the respective collimated sensors are directed. Note that the output signals "cross over" the center of the sensor cluster from their respective collimated sensors. In embodiments where the lens(es) is (are) net concave, the output signals do not cross over the center of the sensor cluster.

Sensor complex clusters, such as those depicted in FIGS. 16-19, can be disposed on a sensor surface instead of, or in combination with, individual sensor complexes, such as the one depicted in FIG. 2.

Nanodot Coincidence Detector

Figure 20:
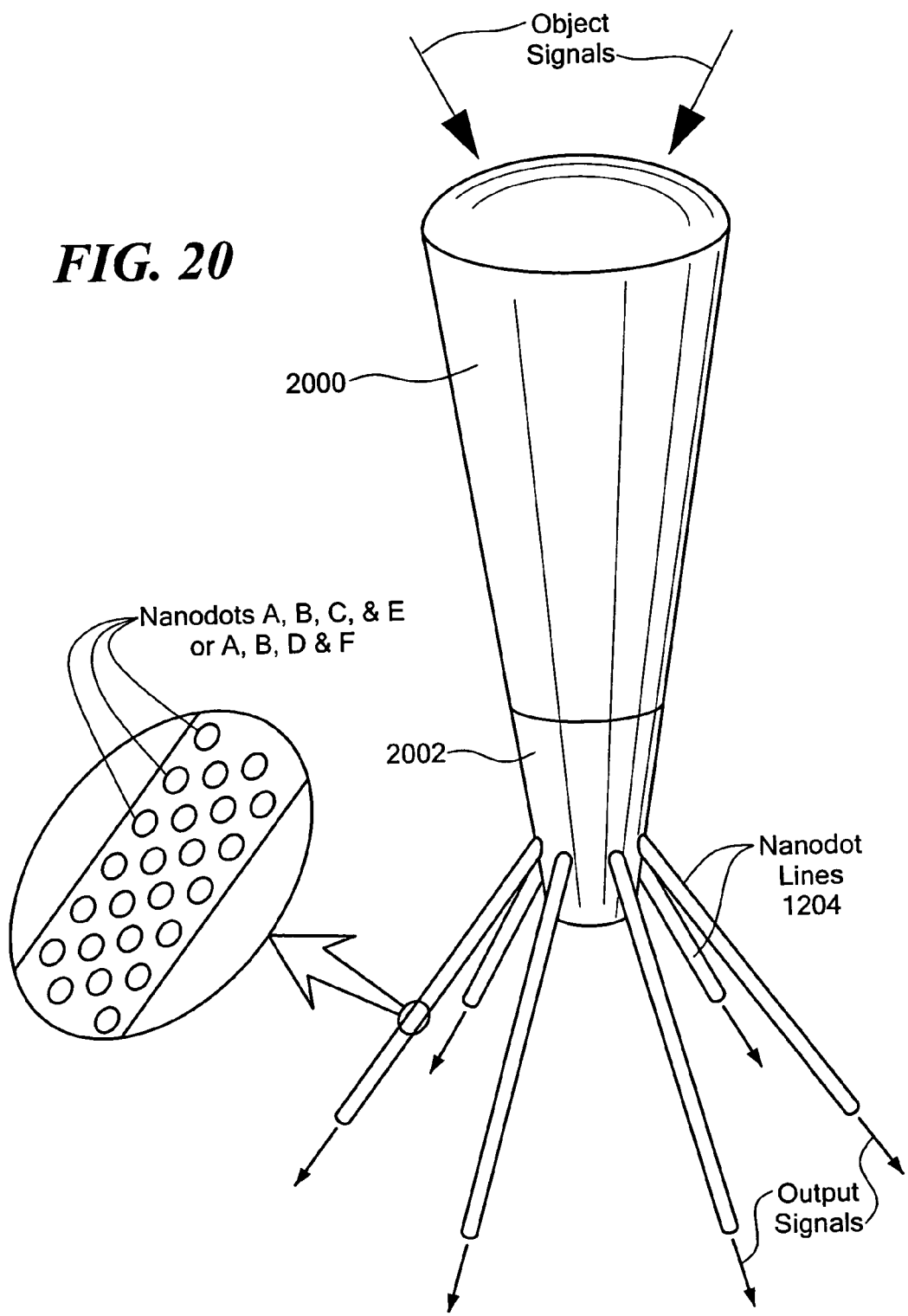
FIG. 20 is a perspective view of the sensor cluster complex of FIG. 18.

Embodiments of the presently disclosed system can be constructed using a combination of technologies. For example, electronic photodiodes can be used with a coincidence detector matrix/visual display that includes nanodots of fluorochromes. FIG. 20 depicts a portion of such an embodiment. A top portion 2000 of a sensor cluster complex includes a plurality of collimated sensors, such as the sensor cluster described above with reference to FIGS. 18-19. A bottom portion 2002 includes a circuit (described below) that drives nanodot lines 1204, which carry output signals from the sensors, at angles, into a coincidence detector matrix (not shown).

As shown in the insert on FIG. 20, each nanodot line includes nanodots made of four types of fluorochromes. When a fluorochromes is excited by a first characteristic wavelength (its "excitation" wavelength), the fluorochrome emits light at a second characteristic wavelength (its "emission" wavelength), as is well known in the art. This effect is sometimes referred to as fluorescence resonance energy transfer (FRET).

The fluorochromes used in the embodiment of FIG. 20 are referred to as types A, B, C, D, E and F. The fluorochromes are selected based on their characteristic excitation and emission wavelengths. Fluorochrome types C, D, E and F do not produce visible light when they are excited, however each of these types emits light at a wavelength that excites its own type. On the other hand, fluorochrome type A produces a first color of visible light, for example green, when it is excited by coincidental emissions from fluorochrome types C and D. Coincidental emissions means meeting a threshold requirement, such as occurring within a predetermined time or on a sliding time-intensity scale, roughly similar to the "threshold amount of signal" discussed above with respect to FIG. 3. Similarly, fluorochrome type B produces a second color of visible light, for example red, when it is excited by coincidental emissions from fluorochrome types E and F. Returning to the insert on FIG. 20, some of the nanodot lines 1204 include fluorochrome types A, B, C and E, and other of the nanodot lines include fluorochrome types A, B, D and F.

Figure 21:
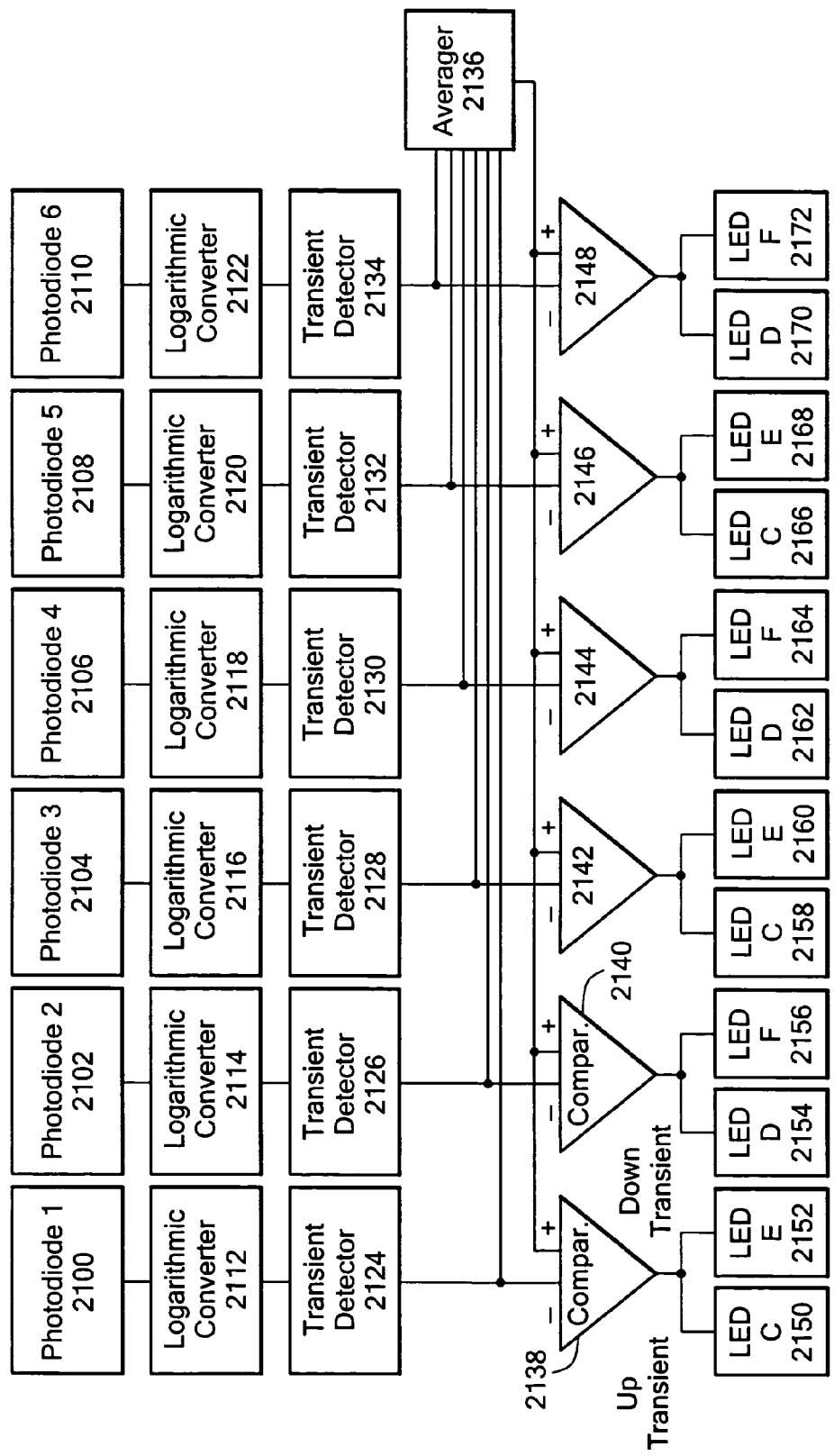
FIG. 21 is a simplified circuit diagram of the sensor cluster complex of FIG. 18.

FIG. 21 is a simplified schematic diagram of the circuit in the bottom portion 2002 of the embodiment of FIG. 20. The circuit detects changes in flux and uses light emitting diodes (LEDs) to illuminate the nanodot lines in response to these flux changes to excite certain nanodots in the nanodot links. Each photodiode 2100-2110 is connected, through a respective logarithmic converter 2112-2122, to a respective transient detector 2124-2134. The outputs of the transient detectors 2124-2134 are fed to respective comparators 2138-2148 and to an averager 2136. The output of the averager 2136 represents an ambient flux detected by the collimated sensors. The output of the averager 2136 is fed to the comparators 2138-2148. The outputs of the comparators 2138-2148 represent differences between flux transients detected by the directional sensors and transients in the ambient flux. The comparators 2138-2148 provide two output signals: one representing a detected increase in contrast or reflectivity (an "up" transient), and the other representing a detected decrease in contrast or reflectivity (a "down" transient). These signals can be of uniform magnitude or the signals' magnitudes can indicate degrees of contrast changes, as discussed above. The comparators' output signals drive respective LEDs 2150-2172, which illuminate the respective ends of the nanodot lines 1204 that terminate in the bottom portion 2002 (FIG. 20).

The averager 2136 and the comparators 2138-2148 are optional. If these components are omitted, the transient detectors 2124-2134 directly drive the LEDs 2150-2172. In this case, the transient detectors 2124-2134 can provide respective up and down transient signals to drive the LEDs 2150-2172. Similarly, the logarithmic converters and the transient detectors are each optional.

Optionally, threshold detectors (not shown) can be interposed before the LEDs 2150-2172, such as between the comparators 2138-2148 and the respective LEDs. Without the threshold detectors, the LEDs can be driven with continuously variable signals that control the brilliance of the LEDs. With the threshold detectors, the LEDs 2150-2172 can be controlled to be either on or off.

Circuits, software or firmware described above or other function equivalents can be used for the logarithmic converters, transient detectors, comparators and threshold detectors or combinations thereof.

Each comparator 2138-2148 drives one pair of LEDs. For example, LED 2150 is driven when comparator 2138 detects an up transient. The wavelength of the LED 2150 is chosen so it excites fluorochrome type C. The other LED 2152 of the pair is driven when comparator 2138 detects a down transient. The wavelength of the other LED 2152 is chosen so it excites fluorochrome type E. LEDs 2150 and 2152 are arranged to illuminate the end of the nanodot line that corresponds to photodiode 2100. Thus, when a transient is detected, one of the LEDs 2150 or 2152 lights, exciting fluorochrome type C or E in the nanodot line.

Figure 22:
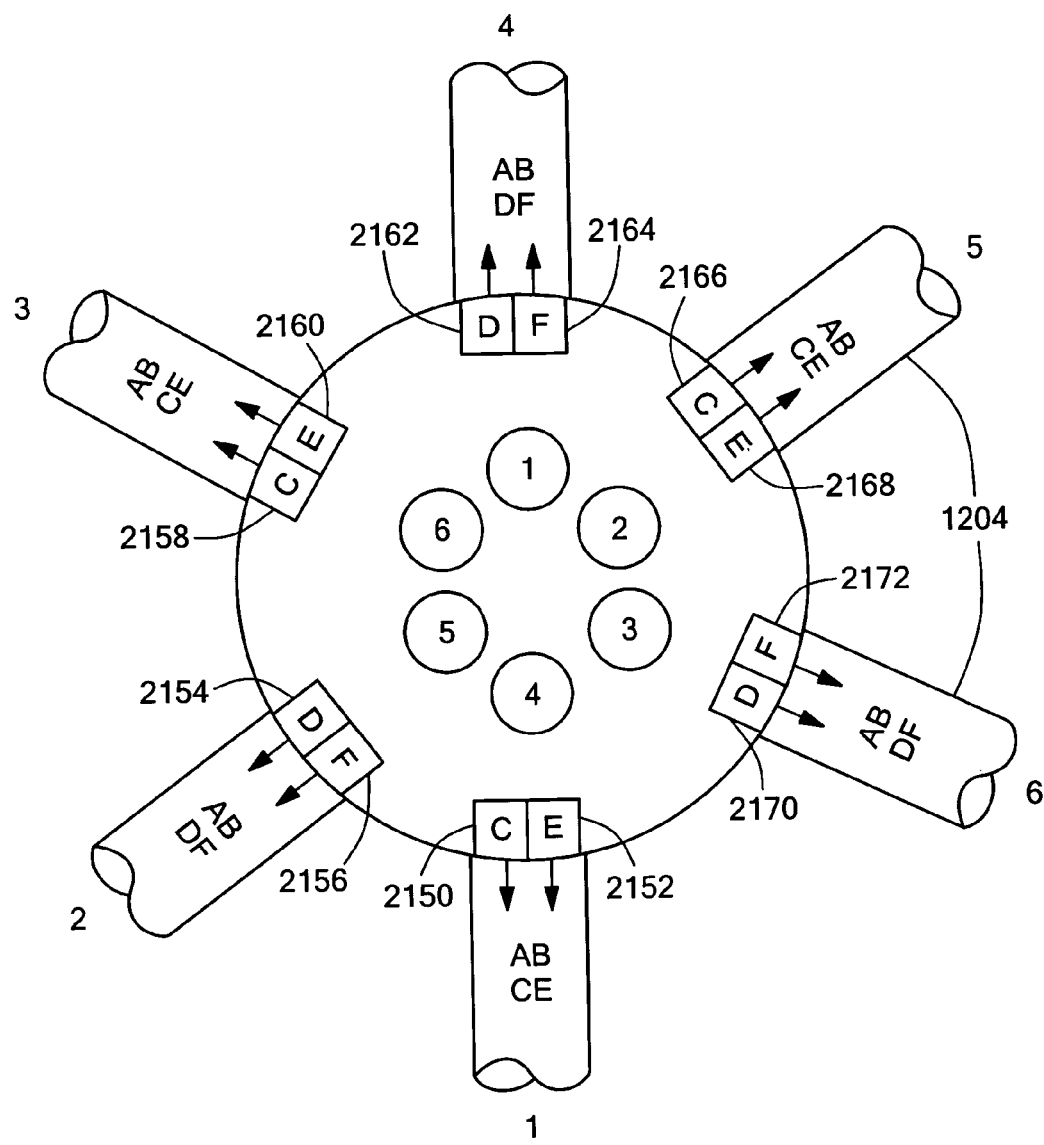
FIG. 22 is a simplified schematic diagram of a portion of the sensor cluster complex of FIG. 18.

For simplicity, an LED that emits a wavelength that excites fluorochrome type X is referred to as "LED X." Depending on the associated photodiode 2100-2110, an up transient causes either a C or D LED to be driven, while a down transient causes either an E or F LED to be driven. FIG. 22 shows the relationships between the nanodot lines, such as nanodot lines 1204, corresponding to the collimated sensors 1-6 and the LEDs 2150-2172 that are driven when up or down transients are detected in relation to these collimated sensors. Note that FIG. 22 is oriented to correspond with FIG. 19.

Figure 23:
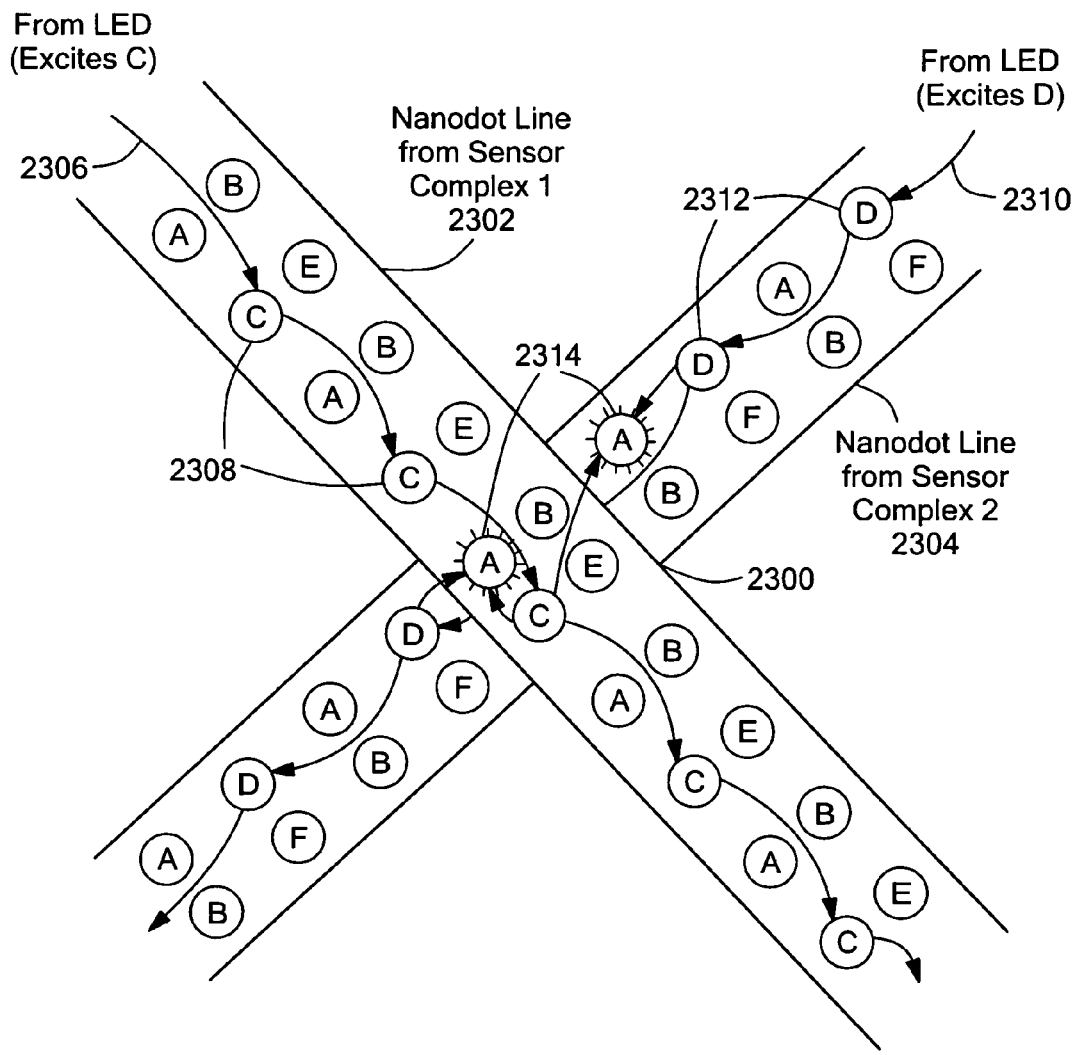
FIG. 23 is a simplified schematic diagram of a portion of a coincidence detector, according to another embodiment of the present invention.

As noted, the nanodot lines 1204 descend at angles into a coincidence detector matrix. FIG. 23 is a simplified schematic diagram of two nanodot lines near a coincidence point 2300 in the coincidence detector matrix. A first nanodot line 2302, from a first sensor complex, "crosses" a second nanodot line 2304, from a second sensor complex, at the coincidence point 2300. Since the nanodot lines have finite widths, the nanodot lines do not necessarily physically cross. Instead, the nanodot lines can be very close, or even touch each other, at the coincidence point 2300. However, for simplicity, nanodot lines are referred to herein as "crossing" at coincidence points. Also for simplicity, only two nanodot lines are shown in FIG. 23, although more than two nanodot lines can cross at a coincidence point.

Assuming two collimated sensors coincidentally detect flux transients that differ from transients in the background flux, FIG. 23 shows a first signal 2306 propagating down the first nanodot line 2302, thereby exciting the C-type fluorochromes 2308. This signal 2306 was initiated when a C LED illuminated the end of the nanodot line 2302, exciting C-type nanodots near the end of the line. These nanodots excited other nanodots further down the nanodot line 2302, thus creating a chain reaction.

A second signal 2310, initiated by a D LED at the end of the second nanodot line 2304, propagates down the second nanodot line 2304, exciting the D-type fluorochromes 2312. At the coincidence point 2300, coincidental emissions from the C-type fluorochromes 2308 in the first nanodot line 2302 and from the D-type fluorochromes 2312 in the second nanodot line 2304 excite A-type fluorochromes 2314 in one or both nanodot lines. Consequently, the A-type fluorochromes 2314 emit visible light and provide a visible display of a contrasty point on an object.

The nanodot lines 2302 and 2304 and E-type and F-type nanodots therein operate similarly when an opposite transient is detected to excite B-type fluorochromes to emit visible light of a different color.

Nanodot lines can be fabricated in a viewing device, such as the device illustrated in FIG. 7, by various techniques, such as laser drilling bores into a sensor surface and filling the bores with the appropriate types of fluorochromes. Because the nanodot lines have finite widths and do not necessarily physically cross, the bores might not be regularly spaced within the coincidence detector matrix, or the nanodot lines might not coincide with lines drawn from the centers of faces of a polyhedron-shaped sensor surface (such as the sensor surface 406 in FIG. 4). The locations of the respective sensors or sensor complexes on the sensor surface can be adjusted, so the sensors' axes correspond to locations of the nanodot lines within the coincidence detector matrix. Furthermore, the nanodot lines need not have uniform widths along their lengths. For example, the nanodot lines can be tapered, increasing in width as they descend into the coincidence detector matrix to correspond to reception cones of the directional sensors.

Alternatively, an embodiment that does not distinguish between up and down transients can be constructed. In such an embodiment, the transient detectors 2124-2134 need not output signals for both types of transients, and only half the number of LEDs 2150-2172 and half the number of fluorochrome types are needed.

Sensors

As noted, the presently disclosed system has been described with reference to infrared sensors, although other sensor types and combinations of sensor types can be used. For example, sensors that detect radio frequency (RF) signals, microwaves (antennas, waveguides, etc.), visible light, ultraviolet or other invisible frequencies of light (photodiodes, photocells, photomultipliers, etc.), x-rays, sonic, or ultrasonic (piezoelectric devices, electret, ribbon or dynamic microphones, etc.) signals can be used. Various well-known techniques can be used to make such signal sensors directional. For example, parabolic dishes can be used to make sonic or ultrasonic sensors directional, and lenses can be used to reduce reception angles of light sensors.

Figure 25:
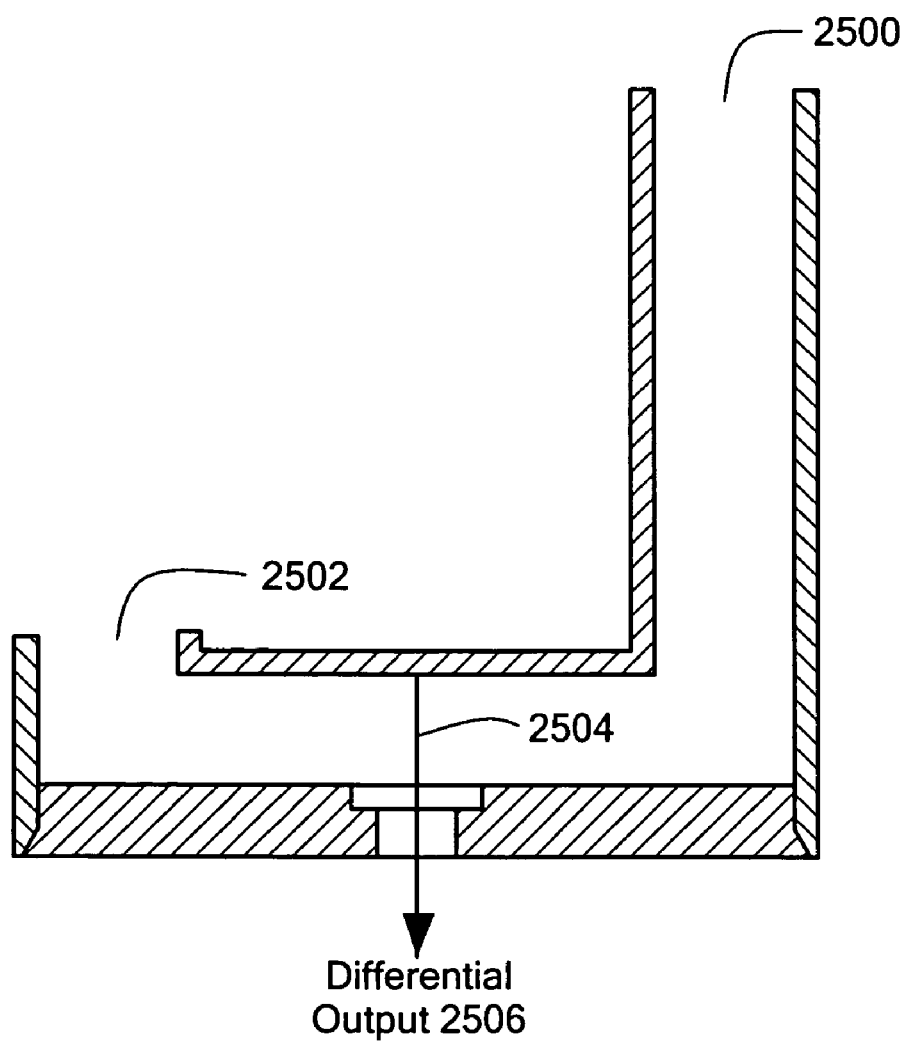
FIG. 25 is a simplified schematic diagram of the combinations sonic sensor and comparator, according to one embodiment of the present invention.

Although embodiments that employ separate comparators are disclosed, other embodiments integrate comparators with sensors. For example, FIG. 25 is a schematic diagram of a combination sonic sensor and comparator. The device includes a directional pressure wave input port 2500 and a non-directional background (ambient) pressure wave input port 2502. A piezoelectric valve 2504 detects differences between pressure waves arriving at the directional and the background input ports 2500 and 2502, respectively. The piezoelectric valve 2504 provides a differential output signal 2506, which can feed a coincidence detector matrix, with or without intervening processing, such as by a logarithmic converter or transient detector.

As discussed with reference to FIG. 4, directional sensors are distributed across a sensor surface. In the case of sensor surfaces that include planar faces, such as polyhedrons, some or all of the faces have one or more sensor complexes mounted thereon. In the case of smooth sensor surfaces, the sensor complexes are distributed across the sensor surfaces.

In either case, the sensor complexes can, but need not, be distributed in a regular pattern. For example, the sensor complexes can be distributed across a sensor surface similar to the way electrons distribute over a surface of a sphere according to a standard charge repulsion formula. In another example, the sensor complexes can be positioned at intersections of regularly or irregularly spaced latitude and longitude lines. In yet another example, the sensor complexes can be distributed randomly across the sensor surface.

In general, a higher density of sensor complexes oriented towards a region of the field of view yields higher resolution images of objects in the region. In one embodiment, a 32×32 array of sensor cluster complexes is distorted and distributed across a portion of a spherical sensor surface, and each sensor cluster complex includes seven directional sensors.

Output Devices

Some embodiments of the presently disclosed system produced non-visual, humanly-perceptible outputs. For example, outputs from the coincidence detectors can drive tactile, piezoelectric or other sound-generating devices or produce electrical signals that directly stimulate a user's nervous system to cause or simulate perception. The sensor complexes can provide signals in addition to, or in place of, transient signals. For example, the directional sensors can provide transient signals (as described above) and detected audio signals to the coincidence detector matrix. Coincidence detectors that detect a threshold can pass the audio signals to the sound-generating device(s). In this way, the embodiment selectively passes detected sounds from detected objects or locations within the field of view, while blocking ambient sounds. Such an embodiment can be used as a positional hearing aid that automatically selects a listening direction.

The coincidence detectors can use coincidences of sounds to make the threshold determinations. The sensor complexes or the coincidence detectors can include signal processing capabilities to filter out selected types of signals or to select only certain types of signals, such as gun shot sounds. Thus, a device to locate the source of a sound, such as a gun shot, can be constructed.

Alternatively, rather than using the coincidence detector to automatically select a direction from which to pass sound or other signals, a user can identify a point or region in the field of view, thereby selecting one or more groups of directional sensors. Signals from the selected directional sensors can be passed to an output device, such as a speaker. Thus, a "positional microphone" can be constructed. Such a positional microphone picks up sounds from a specified point or region in the field of view. This contrasts with a directional microphone, which picks up sounds from any point along its axis.

If the sensor surface contains a mixture of sensor types, such as light and sound sensors, the coincidence detectors can use one or more types of signals to make the threshold determinations and pass one or more of the types of signals to the humanly-perceptible output device or to a computer or other circuit for further processing. Thus, embodiments can correlate signals from a plurality of sensor types to detect signals, directions or objects of interest. However, the coincidence determinations need not be made using the same type of signal as is ultimately provided to a user. Furthermore, different types of signals can be involved in each of various stages in a system: sensing signals in the field of view, sending transient detection information to coincidence detectors, detecting coincidences, delivering human-perceivable outputs and/or further processing.

Auxiliary Components

As noted with respect to FIG. 8, as an object moves along a path at a constant distance from a sensor surface, corresponding coincidence points occur on what can be considered a surface at a constant depth below the sensor surface within a detector matrix. As noted with respect to FIG. 3, some or all of the coincidence detectors can be connected to a computer or other circuit for further processing. For example, the computer or circuit can be configured to withdraw the sensor surface, if an object is detected within a predetermined distance of the sensor surface or approaching the sensor surface faster than a threshold speed. Muscle wire (which shortens when electrically powered), motors, linear actuators, etc., can be used to withdraw the sensor surface. The speed or amount of withdrawal can be proportional to the speed of an approaching object or the proximity of the object. If a plurality of muscle wires or other actuators is simultaneously driven by respective coincidence detectors, the angle of withdrawal is automatically appropriate (i.e. opposite) to the direction from which the object approaches. Thus, a device according to the present disclosure can exhibit a self-protection, automatic reflex.

Embodiments for detecting signals from objects have been described. Optionally, some or all of the directional signal sensors can be paired with directional light sources or other directional wave or particle beam generators, weapons, etc. (collectively "response generators") oriented in the same directions or toward the same points in the field of view as the respective signal sensors. The paired response generators can be co-located with the directional signal sensors, or the response generators can be located elsewhere. A user can identify a point of interest in the field of view, such as by specifying the corresponding point in the coincidence detector matrix through a user input device. Alternatively, the system can automatically identify the point of interest, such as with pattern matching components, filters, signal processors or other decision logic implemented in hardware, software, firmware or combinations thereof. In either case, the corresponding response generators can illuminate or fire on the identified point or region in the field of view. That is, the device can activate the response generators that correspond to the group of directional signal sensors associated with the point in the field of view, and outputs from the response generators converge on the point of interest in the field of view.

Depending on the nature of the response generators, such a device can function as a directional projector into the field of view (not to be confused with projection angles into a coincidence detector) or a lethal or non-lethal weapon. If the system automatically identifies the point of interest, the projector or weapon can aim itself. For example, a nightlight device can detect an approaching pedestrian and illuminate the pedestrian with a visible lights as he or she walks along an arbitrary path. Furthermore, a control system within the nightlight device can delay extinguishing the response generators (lights) for a predetermined amount of time, such as 30 seconds, after motion ceases to be detected, e.g. to enable the pedestrian to locate his or her keys and unlock a door.

Depending on the nature of the detected object and a confidence level determined by the decision logic, the system can automatically activate the response generators or one of several different types of response generators. For example, if an unidentified person or vehicle is detected, the system can illuminate the object with an infrared or visible light. On the other hand, if, either before or after illuminating the object, the system identifies the approaching object as an enemy, the system can automatically fire a weapon.

Other Embodiments

Although a hand-held embodiment is disclosed, other embodiments can be larger or smaller than a hand-held unit. A sensor array can be any size. For example, microscopic or nano-scale sensor arrays can be used. On the other hand, larger sensor arrays, up to and including astronomic-scale sensor arrays, can be used. A sensor array up to about one hundred meters in diameter can be mounted on a vehicle, such as a truck or rail car. Larger fixed or mobile sensor arrays are also possible. Furthermore, individual sensors, sensor clusters or pluralities thereof can be mounted together on portions of a discontiguous sensor surface, and signals from the sensors can be sent, such as via a local or wide area computer network, to a central location for processing. Some or all of the signal processing can be performed locally (i.e., local to the respective sensors), along the network, at the central location or elsewhere. For example, sensor clusters can be located at various fixed or mobile locations across portions of the earth, other planets, natural or artificial satellites or elsewhere, and signals from these sensor clusters can be processed in a central location. The locations of the sensors need not remain fixed with respect to each other. For example, some sensors of an array can move with an artificial satellite, while other sensors of the array remain stationary on earth.

As noted, in some embodiments, most or all of the directional sensors have a common elevation angle. In other embodiments, the elevation angles of the directional sensors can be dynamically adjusted, such as under software control. For example, to increase the acuity of an image, more directional sensors can be dynamically aimed at points or a region of interest in the field of view. In general, shallower elevation angles (i.e. elevation angles closer to a tangent to the sensor surface) have more sensors in each circle (FIG. 6) of sensors. Each directional sensor's elevation angle can be separately adjusted, or the elevation angles of a group of directional sensors can be adjusted together. Alternatively or in addition, a sensor surface can be dynamically deformed, such as under software control, to reorient the directional sensors. For example, an elastic sensor surface can be inflated or deflated to change the elevation angles of the directional sensors mounted thereon. The azimuth of sensors can also be dynamically adjusted. For example, RF detectors can be electronically "steered," as is commonly done in phased antenna arrays.

Other aspects of systems according to the present disclosure can also be dynamically changed while the systems are in use. For example, the reception angle of one or more of the directional sensors can be changed to adjust the acuity of the system. In one embodiment (similar to the embodiment shown in FIG. 2), the reception angle of a collimated directional sensor is adjusted by employing a telescoping tube in front of a sensor. Lengthening the tube decreases the reception angle. In another embodiment (similar to the embodiment shown in FIGS. 18-20), the shape or placement of the lens(es) can be dynamically adjusted, such as by a motor-driven adjusting mechanism or an internal pressure-varying mechanism, similar to the mechanism discussed with reference to FIGS. 10-11. Various parameters, such as threshold criteria, can be dynamically adjusted, such as in response to the failure of some sensors. Not all coincidence detectors need operate under identical threshold criteria.

Although three-dimensional sensor surfaces, coincidence detector matrices and visual displays have been described, other embodiments can include two-dimensional counterparts.

Those skilled in the art should readily appreciate that the functions of the logarithmic converters, transient detectors, comparators, coincidence detector matrices and other components disclosed herein can be implemented in hardware, software, firmware or a combination thereof. When implemented in hardware, embodiments can include discrete circuits, integrated circuits (including Application Specific Integrated Circuits (ASICSs) and Field Programmable Gate Arrays (FPGAs)), vacuum tubes, photonic circuits, hydraulic circuits, molecular, bioengineered or nano-circuits or other hardware. Although some functional components have been described as diodes, these functions can be implemented with transistors or other circuits, as is well known. Thus, where a term such as "diode" is used, it also means a functionally equivalent component or circuit. Other identified components can be likewise replaced by functional equivalents.

When implemented in software or firmware, embodiments can be stored or delivered in many forms, including, but not limited to, information permanently stored on non-writable storage media (e.g. read-only memory devices for use with a computer, such as a ROM or CD-ROM disk); information alterably stored on writable storage media (e.g. floppy disks, hard drives or flash memory); or information conveyed to a computer or other device through a communication medium, such as a baseband or broadband signal, including a carrier wave, such as over computer or telephone networks via modems.

While the invention is described through the exemplary embodiments described above, it will be understood and appreciated by those of ordinary skill in the art that modification to, and variation of, the illustrated embodiments may be made without departing from the inventive concepts disclosed herein. Furthermore, combinations and sub-combinations of the disclosed embodiments can be utilized. Accordingly, the invention should not be viewed as limited except by the scope and spirit of the appended claims.

What is claimed is:

1. A logarithmic converter for producing an output signal proportional to a logarithm of an input signal, comprising:
   a field effect transistor having a source and a drain defining a source-drain path therethrough and a gate; an input port connected to the gate of the field effect transistor for receiving the input signal;
   a first diode connected in series with the source-drain path of the field effect transistor;
   a second transistor having an emitter and a collector defining an emitter-collector path therethrough and a base, the base being connected to a junction between the first diode and the field effect transistor;
   a second diode connected in series with the emitter-collector path of the second transistor; and
   an output port connected to a junction between the second diode and the emitter-collector path of second transistor.

2. A logarithmic converter for producing an output signal proportional to a logarithm of an input signal, comprising:
   a first transistor having a current path therethrough and a high-impedance first control port, resistance of the current path being controlled by at least one of a voltage, a current and a charge applied to the first control port;
   an input port connected to the first control port of the first transistor for receiving the input signal;
   a first diode connected to the first transistor via a junction between the first diode and the first transistor, such that the first diode is connected in series with the current path of the first transistor via the junction;

a second transistor having a current path therethrough and a second control port, the second control port being connected to the junction between the first diode and the first transistor;

a second diode connected in series with the current path of the second transistor; and an output port connected to a junction between the second diode and the current path of second transistor.

* * * * *